US 6,580,966 B2

(12) United States Patent
Shimada

(10) Patent No.: US 6,580,966 B2
(45) Date of Patent: Jun. 17, 2003

(54) IMAGE FORMING APPARATUS CAPABLE OF INVERTING SHEET, CONTROL METHOD THEREOF, AND RECORDING MEDIUM RECORDING PROGRAM FOR SUCH CONTROL

(75) Inventor: Bungo Shimada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 161 days.

(21) Appl. No.: 09/790,679

(22) Filed: Feb. 23, 2001

(65) Prior Publication Data

US 2001/0021317 A1 Sep. 13, 2001

(30) Foreign Application Priority Data

Feb. 29, 2000 (JP) ........................................ 2000-054861

(51) Int. Cl.⁷ ................................................ G06F 7/00
(52) U.S. Cl. ...................... 700/223; 700/227; 271/291; 414/789.9
(58) Field of Search ................................ 700/227, 228, 700/225, 226; 271/291; 414/789.9

(56) References Cited

U.S. PATENT DOCUMENTS

| | | | | |
|---|---|---|---|---|
| 5,076,560 A | * | 12/1991 | Russel | 271/3.1 |
| 5,078,379 A | * | 1/1992 | Leisner | 271/3.1 |
| 5,119,213 A | * | 6/1992 | Graves | 358/488 |
| 5,374,049 A | * | 12/1994 | Bares et al. | 271/186 |
| 5,449,163 A | * | 9/1995 | Wong et al. | 271/186 |
| 5,530,790 A | * | 6/1996 | Ueyama | 395/102 |
| 5,579,083 A | * | 11/1996 | Naito et al. | 355/50 |
| 5,839,841 A | * | 11/1998 | Iunui et al. | 400/708 |
| 5,954,436 A | * | 9/1999 | Kageyama et al. | 400/188 |
| 6,151,478 A | * | 11/2000 | Katsuta et al. | 399/372 |

FOREIGN PATENT DOCUMENTS

JP    11-243486    9/1999

* cited by examiner

*Primary Examiner*—Donald P. Walsh
*Assistant Examiner*—Michael E. Butler
(74) *Attorney, Agent, or Firm*—Fitzpatrick, Cella, Harper & Scinto

(57) ABSTRACT

In an output control method for an image processing apparatus which has a function to invert a recording sheet and continuously performs image forming and outputting for the plural recording sheets in order to prevent that the recording sheets inverted and discharged and the recording sheets incapable of being inverted and thus discharged as it is mix together in one job, it is checked whether or not there is an instruction to invert the recording sheet, it is further judged if there is the instruction whether or not each of the plural recording sheets can be inverted by the inversion function, and if the recording sheet incapable of being inverted exists, all of the plural recording sheets are output without any inversion.

30 Claims, 20 Drawing Sheets

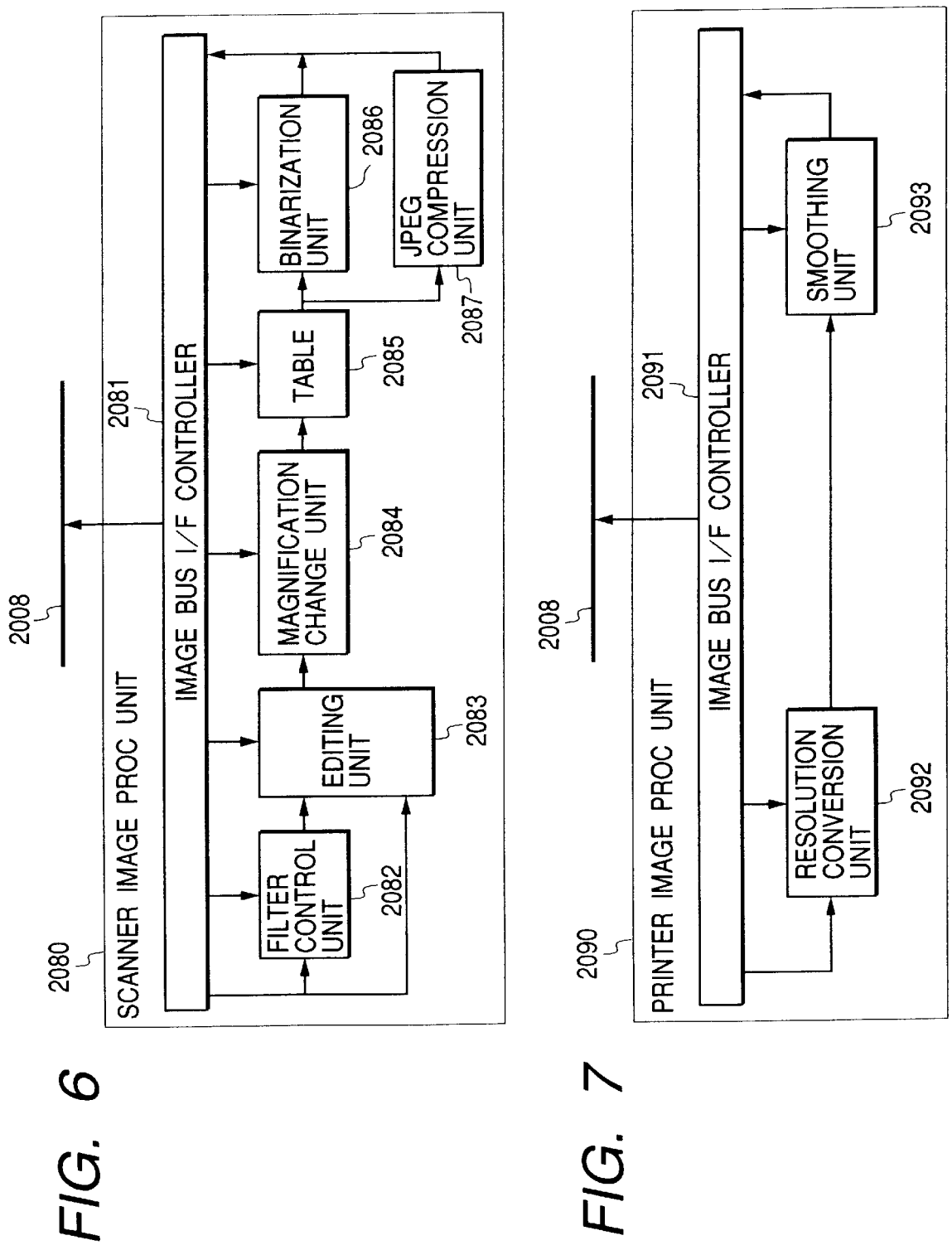

FIG. 20

| WIDTH |
|---|
| LINES |
| SOURCE |
| |
| |
| |
| |
| |

FIG. 21

| BOOKNO |
|---|
| FEED_REQ |
| IMAGE_START |
| IMAGE_REQ |
| IMAGE_END |
| SHEET_OUT |
| |
| |

FIG. 24

| SIZE | THE NUMBER OF OUTPUT SHEETS | INVERTIBLE/ UNINVERTIBLE |
|---|---|---|
| A4 | 10 | INVERTIBLE |
| A4-R | 0 | INVERTIBLE |
| B4 | 0 | INVERTIBLE |
| B5 | 0 | INVERTIBLE |
| A3 | 2 | INVERTIBLE |
| POSTCARD | 0 | UNINVERTIBLE |
| FREE | 0 | UNINVERTIBLE |

FIG. 25

| TYPE | THE NUMBER OF OUTPUT SHEETS | INVERTIBLE/ UNINVERTIBLE |
|---|---|---|
| COMMON SHEET | 11 | INVERTIBLE |
| THICK SHEET | 1 | UNINVERTIBLE |
| OHP | 0 | UNINVERTIBLE |
| THIN SHEET | 0 | UNINVERTIBLE |

IMAGE FORMING APPARATUS CAPABLE OF INVERTING SHEET, CONTROL METHOD THEREOF, AND RECORDING MEDIUM RECORDING PROGRAM FOR SUCH CONTROL

BACKGROUND OF THE INVENTION

1. Field of the Invention

The present invention relates to an image forming apparatus which can invert a sheet, a method of controlling the image forming apparatus, and a recording medium which records a program for such the control.

2. Related Background Art

Recently, a printer which can designate a facedown discharge of recording sheets (facedown sheet discharge) and a faceup discharge of recording sheets (faceup sheet discharge) by a printer driver on the side of a computer is developed. When the facedown sheet discharge is designated, the printer inverts the recording sheet and then discharges the inverted recording sheet. There is a printer which discharges the inverted sheet to the sheet discharge unit same as that to which an uninverted sheet is discharged, and is a printer which discharges the inverted sheet to the sheet discharge unit different from that to which an uninverted sheet is discharged.

Japanese Patent Application Laid-Open No. 11-243486 discloses an image forming apparatus which inverts and discharges a sheet on which an image was formed. In this apparatus, when it is designated to set an OHP (overhead projector) insert sheet mode and further designated to form the image same as that formed on an OHP sheet also on an insert sheet (i.e., a common sheet), a right image is formed on the insert sheet and this insert sheet is inverted and discharged, while a mirror image is formed on the OHP sheet and this OHP sheet is discharged without inversion. Such control is performed because the OHP sheet is not preferable to be inverted (i.e., unsuitable for inversion).

However, in recent application software, a sheet size and a sheet type can be set for each page in one print job, a problem is caused when a job partially having a page of postcard size or a job partially having a page of thick sheet is intended to be subjected to printing. Namely, as well as the above OHP sheet, the sheet of postcard size and the thick sheet are not preferable to be inverted, whereby there is some fear that these sheets cause a sheet jam when the inversion sheet discharge is designated.

Even if the pages which are preferable to be inverted are inverted and discharged and the pages which are not preferable to be inverted are discharged without inversion, a problem that the pages which were discharged faceup and the pages which were discharged facedown are mixed with others and stacked on the sheet discharge unit in one print job is caused. Further, a problem that the faceup-discharged pages and the facedown-discharged pages are stacked on the different sheet discharge units respectively is caused.

SUMMARY OF THE INVENTION

An object of the present invention is to provide an image forming apparatus by which it is possible to prevent that recording sheets inverted and discharged and recording sheets discharged without inversion are mixed with others in one print job, a method of controlling the image forming apparatus, and a recording medium which records a program for such the control.

Another object of the present invention is to provide an image forming apparatus by which it is possible to prevent that recording sheets obtained in one image forming job are discharged to separate sheet discharge units respectively, a method of controlling the image forming apparatus, and a recording medium which records a program for such the control.

In order to achieve the above objects, the present invention provides an image forming apparatus comprising:

an image forming unit for forming images included in an image forming job on sheets;

an inverter for inverting the sheet formed by the image forming unit;

a controller for controlling a transportation of the sheet whether or not the sheet formed is transported to the inverter; and a discriminator for discriminating if the image forming job includes at least one page which is not preferable to be transported to the inverter, wherein the controller controls the transportation of the sheet so that all sheets regarding the image forming job are not transported to the inverter when the discriminator discriminates that the image forming job includes at least one sheet which is not preferable to be inverted.

Further, the present invention provides a method for controlling an image forming apparatus having an inverter for inverting the sheet, comprising the steps of:

forming images included in an image forming job on sheets;

discriminating if the image forming job includes at least one page which is not preferable to be transported to the inverter; and controlling a transportation of the sheet so that all sheets regarding the image forming job are not transported to the inverter when the discriminating step discriminates that the image forming job includes at least one sheet which is not preferable to be inverted.

Further, the present invention provides a recording medium for storing a program code for controlling an image forming apparatus having an inverter for inverting the sheet, the program code comprising:

a code for causing the image forming apparatus to form images included in an image forming job on sheets;

a code for discriminating if the image forming job includes at least one page which is not preferable to be transported to the inverter; and a code for controlling a transportation of the sheet so that all sheets regarding the image forming job are not transported to the inverter when the discriminating code discriminates that the image forming job includes at least one sheet which is not preferable to be inverted.

Other objects and features of the present invention will become apparent from the following detailed description and the attached drawings.

BRIEF DESCRIPTION OF THE DRAWINGS

FIG. 6 is a block diagram showing the structure of a scanner image processing unit 2080 of the embodiment;

FIG. 7 is a block diagram showing the structure of a printer image processing unit 2090 of the embodiment;

FIG. 20 is a diagram for explaining a print parameter register table in an engine I/F board of the embodiment;

FIG. 21 is a diagram for explaining a communication command table between a printer and the engine I/F board of the embodiment;

FIG. 24 is a diagram for explaining an output sheet size list of the embodiment; and FIG. 25 is a diagram for explaining an output sheet type list of the embodiment.

DETAILED DESCRIPTION OF THE PREFERRED EMBODIMENTS

Hereinafter, one embodiment of the present invention will be explained with reference to the attached drawings.

Entire Structure of Hardware

Figure 3:
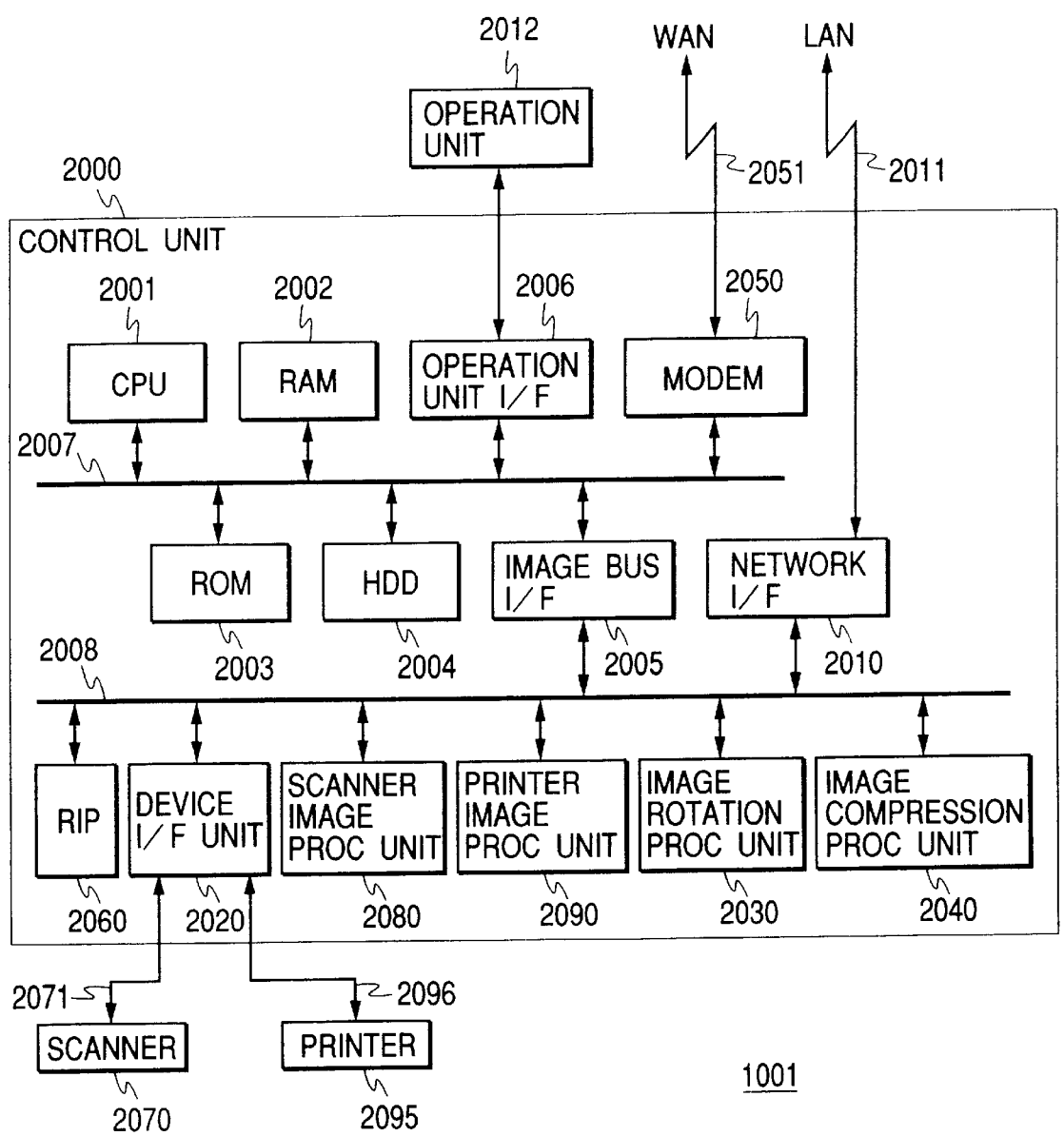
FIG. 3 is a block diagram showing the entire structure of hardware of the image processing apparatus of the embodiment.

FIG. 3 is a block diagram showing the hardware structure of an image processing apparatus 1001 according to the present embodiment.

A control unit 2000 is the controller which is connected to a scanner 2070 acting as the image input device and a printer 2095 acting as the image output device, and equally connected to a LAN (local area network) 2011 and a public line or a WAN (wide area network) 2051, whereby input and output of image information and device information are controlled.

A CPU (central processing unit) 2001 is the controller which controls an entire system.

A RAM (random access memory) 2002 is the system working memory which is used when the CPU 2001 operates. The RAM 2002 also acts as the image memory which temporarily stores image data.

A ROM (read-only memory) 2003 is the boot ROM which stores a system boot program.

An HDD (hard disk drive) 2004 stores system software and various image data.

An operation unit I/F (interface) 2006 is the interface unit which interfaces with an operation unit 2012 and outputs the image data to be displayed to the operation unit 2012. Further, the operation unit I/F 2006 functions to transfer to the CPU 2001 the information which is input from the operation unit 2012 by a user of this system.

A modem 2050 which is connected to the public line (WAN) 2051 inputs and outputs various information.

Such devices as above are disposed on a system bus 2007.

An image bus I/F 2005 is the bus bridge which connects the system bus 2007 to an image bus 2008 which transfers image data at high speed, whereby the data structure is converted.

The image bus 2008 consists of a PCI (peripheral component interconnect) bus or an IEEE1394 (Institute of Electrical and Electronics Engineers standard 1394) bus.

The following devices are disposed on the image bus 2008.

A network I/F 2010 which is connected to the LAN 2011 inputs and outputs various information.

An RIP (raster image processor) 2060 expands a PDL (page description language) code into a bitmapped image.

A device I/F unit 2020 connects the scanner 2070 (image input device) and the printer 2095 (image output device) to the control unit 2000, and performs synchronous and asynchronous conversion to image data.

A scanner image processing unit 2080 corrects, processes and edits the input image data. A printer image processing unit 2090 performs correction or the printer 2095, resolution conversion and the like to print output image data.

An image rotation processing unit 2030 performs rotation of image data. An image compression processing unit 2040 performs a compression process of JPEG (joint photographic experts group) method to multivalue image data, and performs a compression process of JBIG (joint bi-level image experts group) method or MH (modified Huffman coding) method to binary image data. The image compression processing unit 2040 also performs a decompression (or expansion) process.

The structure as described above can be separated on the boundaries of the system bus 2007 and the image bus 2008 in consideration of extendibility in the image processing part, and a general computer is applied to the structure.

In the above structure, by making the image bus interface all-purpose, the freedom degree by which image processes can be arbitrarily combined is given, and the extendibility by which prospects are considered is given. Especially, since there is a possibility that various standards are proposed to the codec part in the future, the codec part is connected to the side of the image bus such that it can be easily exchanged.

Image Input/Output Unit

Figure 4:
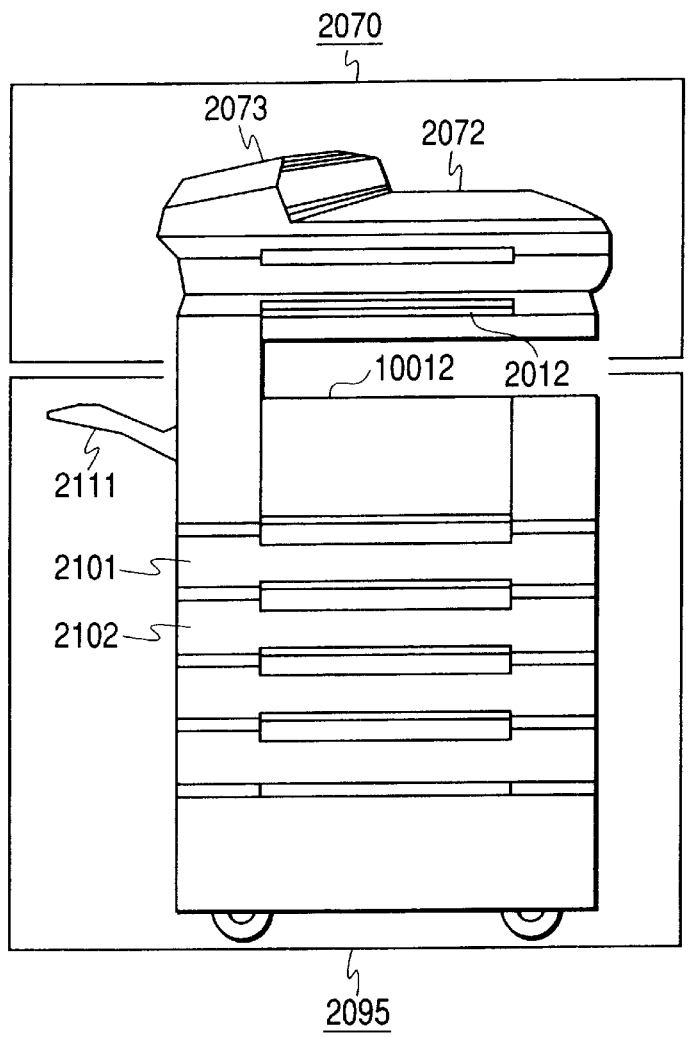
FIG. 4 is a diagram for explaining an image input/output device of the embodiment.

FIG. 4 is a diagram for explaining the image input/output device. The scanner unit 2070 acting as the image input device illuminates an image on a sheet being an original, scans it by a CCD (charge coupled device) line sensor (not shown), and converts the scanned image into an electrical signal as raster image data 2071 shown in FIG. 3.

The original is set to a tray 2073 of an original feeder 2072 by a user. Then, according as an instruction to start reading is input from an operation unit 2012 by the user, the CPU 2001 instructs the original feeder 2072 to feed the original one by one and the scanner 2070 to read an image on the original.

The printer 2095 acting as the image output device prints an image on a sheet based on raster image data 2096 shown in FIG. 3. Here, the printer 2095 can apply any of print methods, such as an electrophotographic method in which a photosensitive drum or a photosensitive belt is used, an inkjet method in which ink ejected from a micronozzle array directly prints the image on the sheet, and the like.

In the printer 2095, there are provided plural sheet feed stages by which different sheet sizes and/or different sheet directions are selectable. Thus, the printer 2095 includes sheet cassettes 2101 and 2102 respectively corresponding to these sheet feed stages. Further, the printer 2095 includes a sheet discharge tray 2111 which receives the sheets subjected to the printing.

Operation Unit

Figure 5:
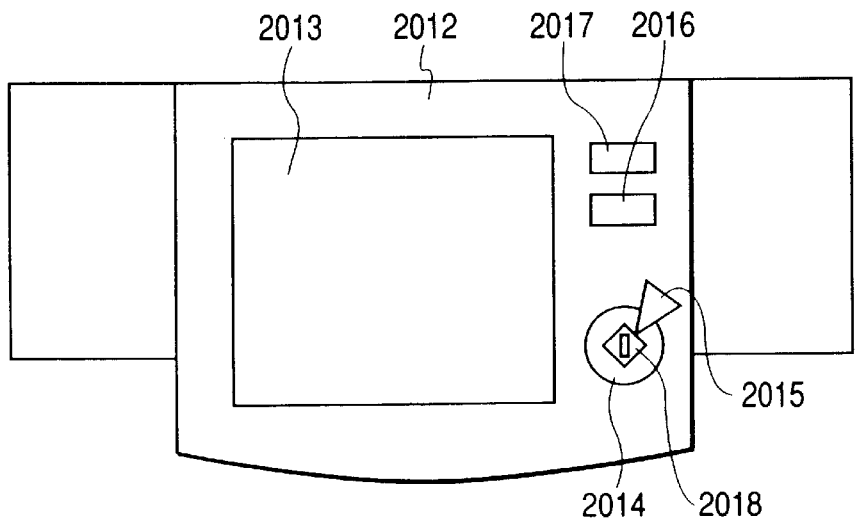
FIG. 5 is a structural diagram showing an operation unit 2012 of the embodiment.

FIG. 5 is a structural diagram showing the operation unit 2012. An LCD (liquid crystal display) unit 2013 includes a display to which a touch panel sheet is pasted. The LCD unit 2013 display the operation screen of the system, and notifies, when a displayed key is touched, the CPU 2001 of its positional information.

A start key 2014 is used to start, e.g., a reading operation of an original image. A green and red LED (light emitting diode) 2018 is provided in the center part of the start key 2014, and it is indicated according to the color of the LED 2018 whether in the state that the start key 2014 can be used.

A stop key 2015 is used to stop the running operation, an ID (identification) key 2016 is used when a user's ID is input, and a reset key 2017 is used when the setting by the operation unit is initialized.

Scanner Image Processing Unit

FIG. 6 is a block diagram showing the structure of the scanner image processing unit 2080.

An image bus I/F controller 2081 which is connected to the image bus 2008 has a function to control its bus access sequence, control each device in the scanner image processing unit 2080, and generate timing of each device.

A filter control unit 2082 performs a convolution operation by using a spatial filter. An editing unit 2083 recognizes a closed area surrounded by a marker pen in, e.g., input image data, and performs an image process such as shadow, shading, negative/positive reversal or the like to the image data in the closed area.

When a resolution of the read image is changed, a magnification change unit 2084 performs an interpolation operation to the main scan direction of the raster image and performs size enlargement and reduction. The magnification in the sub scan direction is changed by changing scan speed of an image reading line sensor (not shown).

A table 2085 is used to table conversion for converting the read image data (luminance data) into density data.

A binarization unit 2086 binarizes multivalue gray scale image data in an error diffusion process or a screening process.

A JPEG compression unit 2087 performs real-time compression to the multivalue image data output from the table 2085 on the basis of known JPEG compression. A JPEG-encoded data is output from the JPEG compression unit 2087.

The image data which was processed by the scanner image processing unit 2080 is again transferred to the image bus 2008 through the image bus I/F controller 2081.

Printer Image Processing Unit

FIG. 7 is a block diagram showing the structure of the printer image processing unit 2090.

An image bus I/F controller 2091 which is connected to the image bus 2008 has a function to control its bus access sequence, control each device in the printer image processing unit 2090, and generate timing of each device.

A resolution conversion unit 2092 performs resolution conversion to image data sent from the LAN 2011 or the WAN (or public line) 2051 to obtain the resolution of the printer 2095.

A smoothing unit 2093 performs a process to smooth a jaggy of the image data (image roughness appearing at, e.g., an oblique black-and-white boundary) after the resolution conversion.

Image Compression Processing Unit

Figure 8:
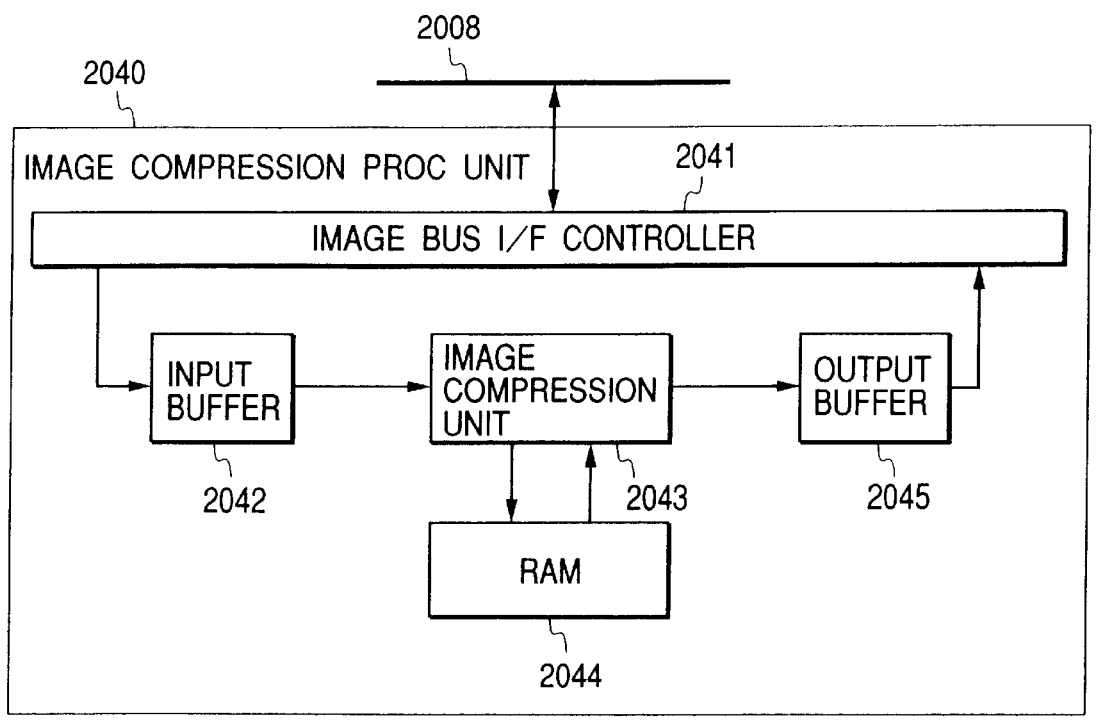
FIG. 8 is a block diagram showing the structure of an image compression processing unit 2040 of the embodiment.

FIG. 8 is a block diagram showing the structure of the image compression processing unit 2040.

An image bus I/F controller 2041 which is connected to the image bus 2008 has a function to control its bus access sequence, control timing to exchange data between an input buffer 2042 and an output buffer 2045, and control mode setting to an image compression unit 2043.

Hereinafter, a processing procedure of the image compression processing unit 2040 will be explained.

The CPU 2001 performs setting for image compression control to the image bus I/F controller 2041, through the image bus 2008.

By this setting, the image bus I/F controller 2041 performs setting of, e.g., MMR (modified modified READ) compression, JBIG (Joint Bi-level Image Experts Group) decompression and the like necessary for the image compression to the image compression unit 2043.

After then, the CPU 2001 again permits the image bus I/F controller 2041 to transfer the image data.

In accordance with such transfer permission, the image bus I/F controller 2041 starts the image data transfer from the RAM 2002 or each device on the image bus 2008.

The received image data is temporarily stored in the input buffer 2042 and then transferred at certain speed according to an image data request of the image compression unit 2043.

At this time, it is judged at the input buffer 2042 whether or not the image data can be transferred between the image bus I/F controller 2041 and the image compression unit 2043. Then, if judged that the image data reading from the image bus 2008 and the image writing to the image compression unit 2043 can not be performed, it is controlled not to perform the data transfer (hereinafter, such control is called "handshaking").

The image compression unit 2043 once stores the received image data in a RAM 2044. This is because, in case of performing the image compression, data of several lines are necessary according to a kind of image compression process.

The image data subjected to the image compression is immediately transferred to the output buffer 2045. In the output buffer 2045, the handshaking between the image bus I/F controller 2041 and the image compression unit 2043 is performed, and the image data is then transferred to the image bus I/F controller 2041.

In the image bus I/F controller 2041, the compressed (or decompressed) image data transferred is further transferred to the RAM 2002 or each device on the image bus 2008.

Such a series of the processes is repeated until a processing request from the CPU 2001 ends (i.e., the processes of necessary pages end) or a stop request is issued from the image compression unit 2043 (i.e., an error in the compression or decompression occurs).

Image Rotation Processing Unit

Figure 9:
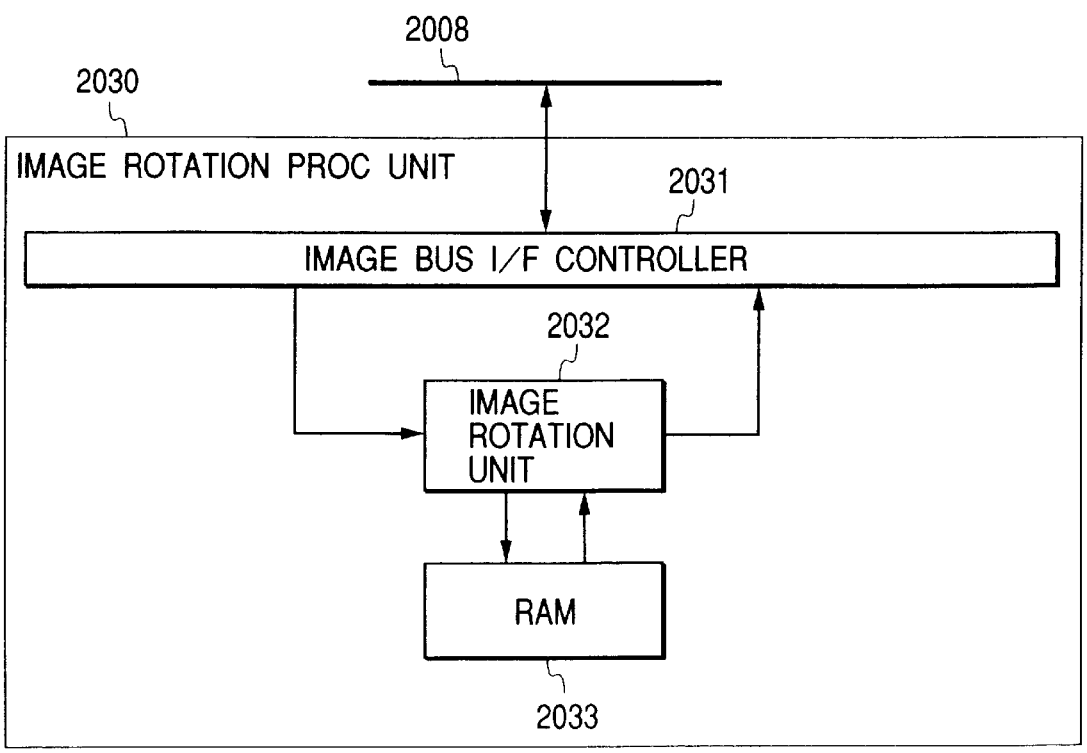
FIG. 9 is a block diagram showing the structure of an image rotation processing unit 2030 of the embodiment.

FIG. 9 is a block diagram showing the structure of the image rotation processing unit 2030.

An image bus I/F controller 2031 which is connected to the image bus 2008 has a function to control its bus access sequence, control mode setting or the like to an image rotation unit 2032, and control timing to transfer image data to the image rotation unit 2032.

Hereinafter, a processing procedure of the image rotation processing unit 2030 will be explained.

The setting to control the image rotation is performed by the CPU 2001 to the image bus I/F controller 2031 through the image bus 2008.

By this setting, the image bus I/F controller 2031 performs the setting of necessary for the image rotation (e.g., an image size, a rotation direction, an angle and the like) to the image rotation unit 2032.

After then, the CPU 2001 again permits the image bus I/F controller 2031 to transfer the image data.

In accordance with such transfer permission, the image bus I/F controller 2031 starts the image data transfer from the RAM 2002 or each device on the image bus 2008.

Here, it is assumed that the size of the data to be transferred is 32 bits, the image size for the rotation is 32×32 (bits), and the image data is transferred on the image bus 2008 in the unit of 32 bits (the image to be managed here is assumed to be binary data).

Figure 10:
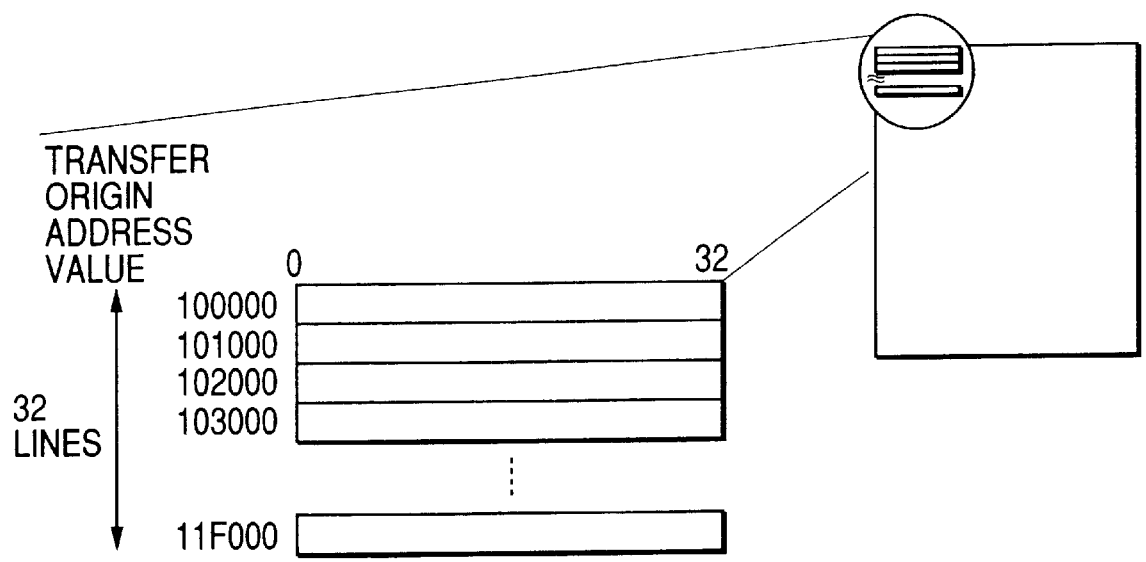
FIG. 10 is a diagram for explaining an image rotation process of the embodiment.

As above, in order to obtain the image of 32×32 (bits), it is necessary to perform the unitary data transfer 32 times, and transfer the image data from discontinuous addresses (FIG. 10).

The image data transferred by the discontinuous addressing is written in a RAM 2033 such that the image is rotated by a desired angle when the image data is read.

Figure 11:
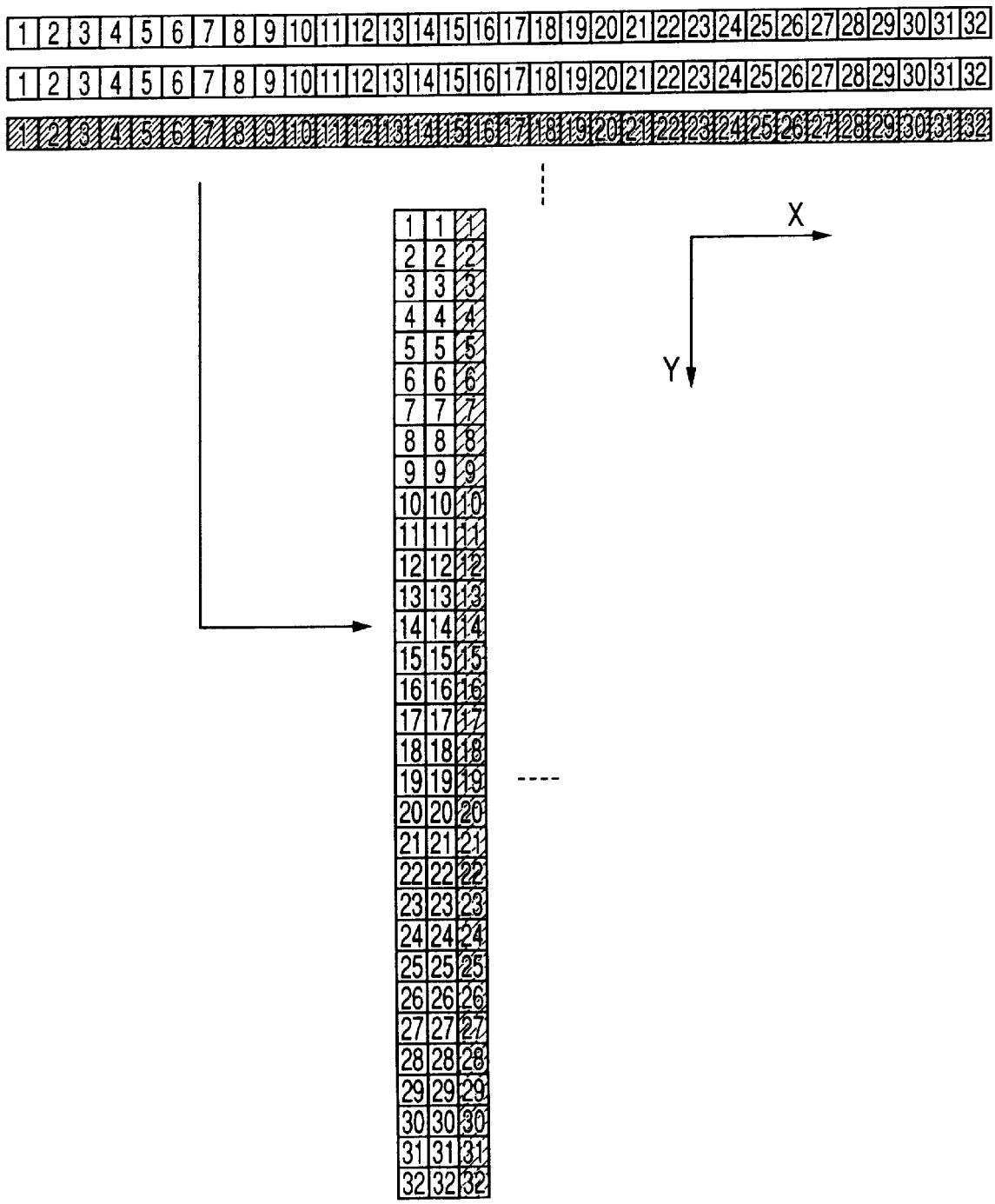
FIG. 11 is a diagram for explaining the image rotation process of the embodiment.

For example, when the image is rotated counterclockwise by 90°, 32-bit image data first transferred is written in the Y direction as shown in FIG. 11. Then, image data is read in the X direction, whereby the image is rotated.

After the rotation (i.e., the writing in the RAM 2033) of the image data of 32×32 (bits) ends, the image rotation unit 2032 reads the image data from the RAM 2033 in the above-described reading manner and transfers the read image data to the image bus I/F controller 2031.

The image bus I/F controller 2031 which received the rotation-processed image data transfers the data to the RAM 2002 or each device on the image bus 2008 by continuous addressing.

Such a series of the processes in the image rotation processing unit 2030 is repeated until a processing request from the CPU 2001 ends (i.e., the processes of necessary pages end).

Device I/F Unit

Figure 12:
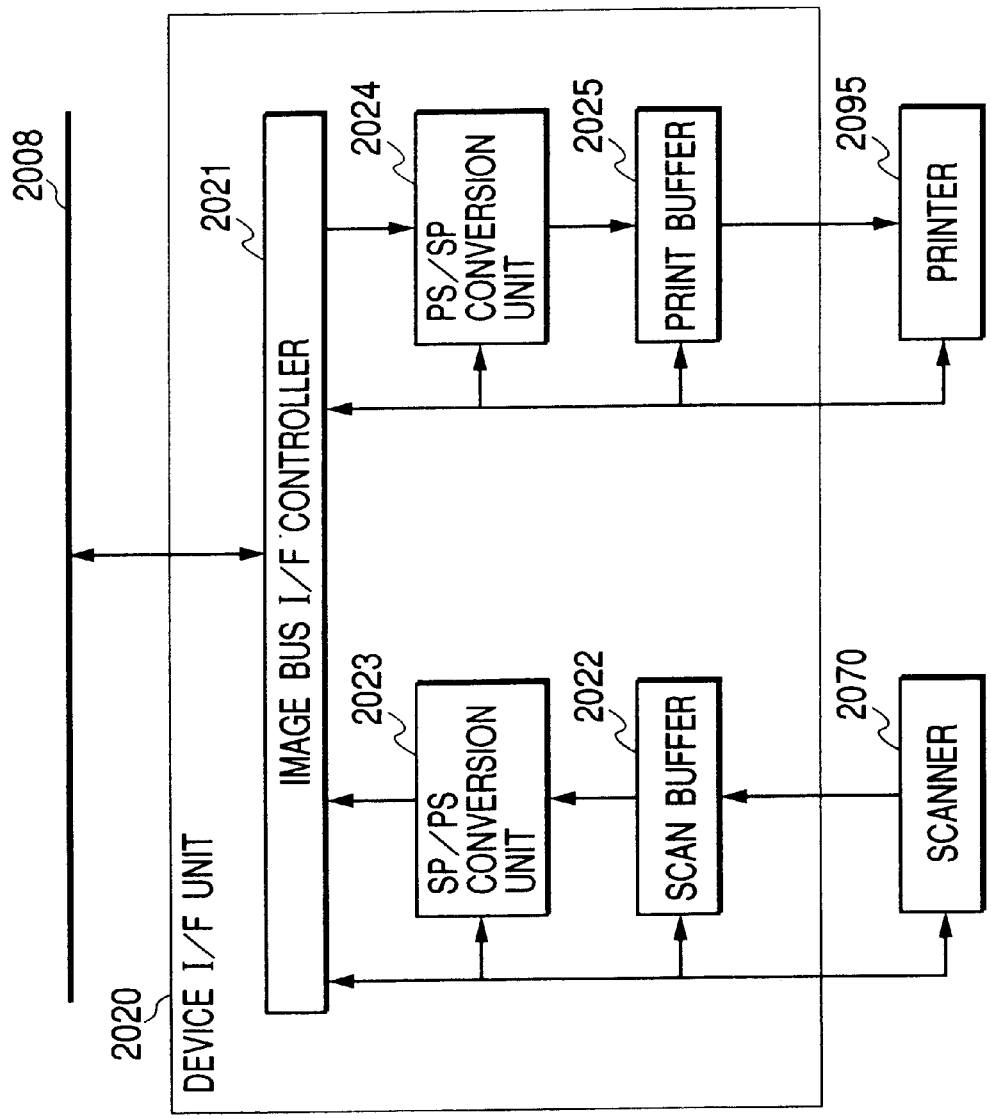
FIG. 12 is a block diagram showing the structure of a device I/F (interface) unit 2020 of the embodiment.

FIG. 12 is a block diagram showing the structure of the device I/F unit 2020.

An image bus I/F controller 2021 which is connected to the image bus 2008 has a function to control its bus access sequence, control each device in the device I/F unit 2020, and generate timing of each device. Further, the image bus I/F controller 2021 generates a control signal to the external scanner 2070 and the printer 2095.

A scan buffer 2022 temporarily stores the image data transferred from the scanner 2070, and outputs image data in synchronism with the image bus 2008.

An SP/PS (serial-to-parallel/parallel-to-serial) conversion unit 2023 ranges in due order or decomposes the image data temporarily stored in the scan buffer 2022 to convert its data width into the data width capable of being transferred to the image bus 2008.

A PS/SP (parallel-to-serial/serial-to-parallel) conversion unit 2024 decomposes or ranges in due order the image data transferred from the image bus 2008 to convert its data width into the data width capable of being stored in a print buffer 2025.

The print buffer 2025 temporarily stores the image data transferred from the image bus 2008, and outputs the image data in synchronism with the printer 2095.

Hereinafter, a processing procedure at the image scan will be explained.

The image data transferred from the scanner 2070 is stored in the scan buffer 2022 in synchronism with a timing signal from the scanner 2070.

Then, in the case where the image bus 2008 is the PCI bus, when the image data equal to or more than 32 bits is stored in the scan buffer 2022, the image data of 32 bits is read from the scan buffer 2022 and transferred to the SP/PS conversion unit 2023 in FIFO (first-in first-out) manner. Then, the image data is converted into the 32-bit image data and transferred to the image bus 2008 through the image bus I/F controller 2021.

Hereinafter, a processing procedure at the image printing will be explained.

In the case where the image bus 2008 is the PCI bus, the image data of 32 bits transferred from the image bus 2008 is received by the image bus I/F controller 2021, transferred to the PS/SP conversion unit 2024, decomposed into the image data of input data bit number of the printer 2095, and stored in the print buffer 2025.

In the case where the image bus 2008 is the IEEE1394 bus, the serial image data transferred from the image bus 2008 is received by the image bus I/F controller 2021, transferred to the PS/SP conversion unit 2024, converted into the image data of input data bit number of the printer 2095, and stored in the print buffer 2905.

Then, in synchronism with a timing signal from the printer 2095, the image data in the print buffer 2025 is transferred to the printer 2095 in FIFO manner.

Entire Structure of System

Figure 1:
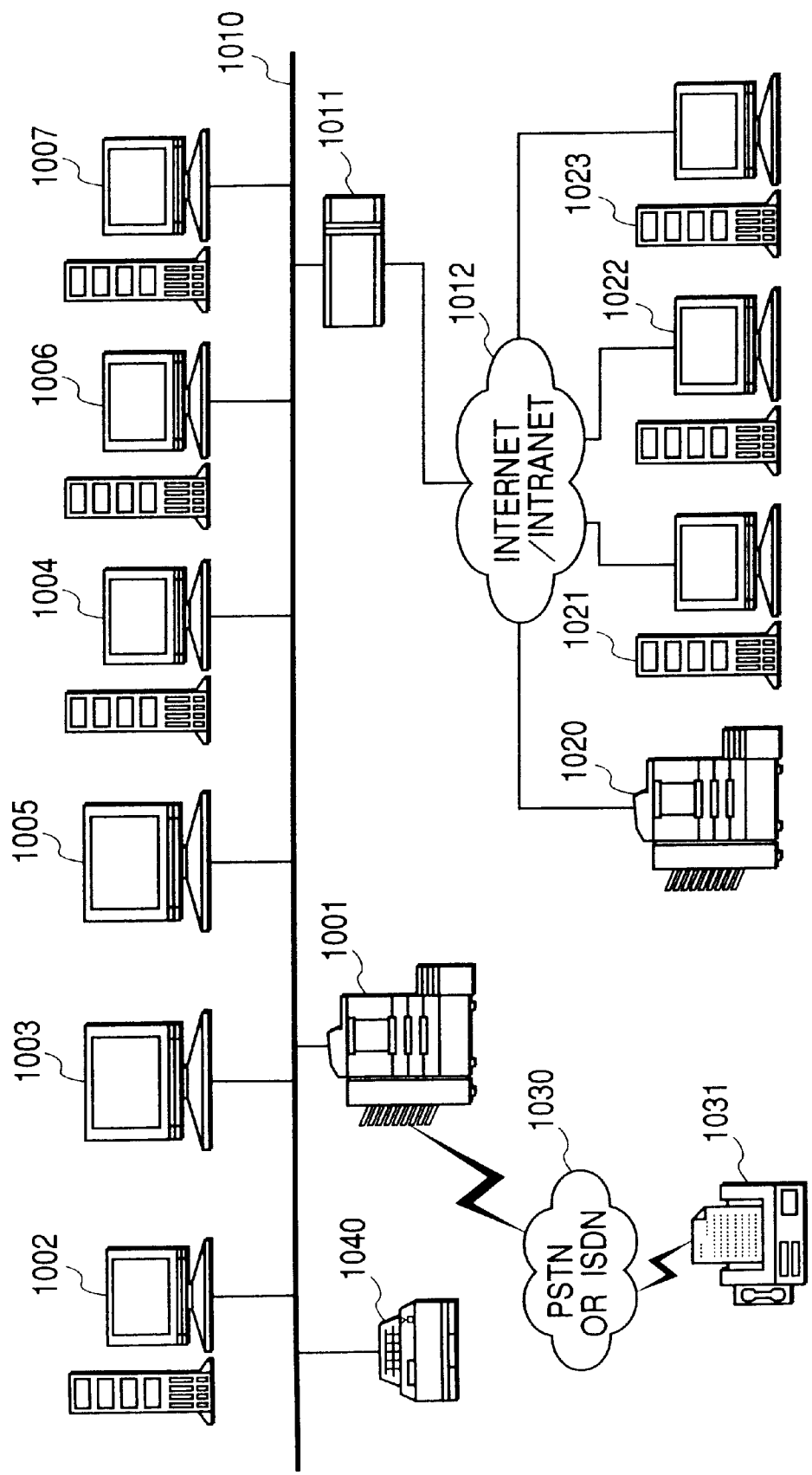
FIG. 1 is a block diagram showing the entire structure of a network system of image processing apparatuses of the embodiment.

FIG. 1 is a block diagram showing the entire structure of the network system including the image processing apparatus 1001 of the embodiment.

The image processing apparatus 1001 which includes the scanner 2070 and the printer 2095 can transfer the image read by the scanner 2070 to a LAN 1010 and print the image received from the LAN 1010 with use of the printer 2095.

Further, the image processing apparatus 1001 can transmit the image read by the scanner 2070 to a PSTN (public switched telephone network) or ISDN (integrated services digital network) 1030 with use of a fax transmission means (not shown), and can print the image received from the PSTN or ISDN 1030 with use of the printer 2095.

A database server 1002 manages as databases the binary image and the multivalue image read by the image processing apparatus 1001.

A database client 1003 of the database server 1002 can read and retrieve the image data stored in the database server 1002.

An electronic mail server 1004 can receive the image read by the image processing apparatus 1001, as an attachment of an electronic mail.

An electronic mail client 1005 can read the mail received by the electronic mail server 1004 and transmit an electronic mail.

A WWW (World Wide Web) server 1006 can send an HTML (hypertext markup language) text to the LAN and print out an HTML text sent from the image processing apparatus 1001.

A DNS (domain name system) server 1007 connects the LAN 1010 to an Internet/intranet 1012 with use of a router 1011.

A database server 1021, a WWW server 1022, an electronic mail server 1023 and an image processing system 1020 respectively similar to the database server 1002, the WWW server 1006, the electronic mail server 1004 and the image processing apparatus 1001 in the embodiment are connected to the Internet/intranet 1012.

Equally, the image processing apparatus 1001 can transmit/receive data to/from a fax machine 1031 through the PSTN or ISDN 1030.

Further, a printer 1040 is connected on the LAN 1010 to be able to print out the image read by the image processing apparatus 1001.

Entire Structure of Software Block

Figure 2:
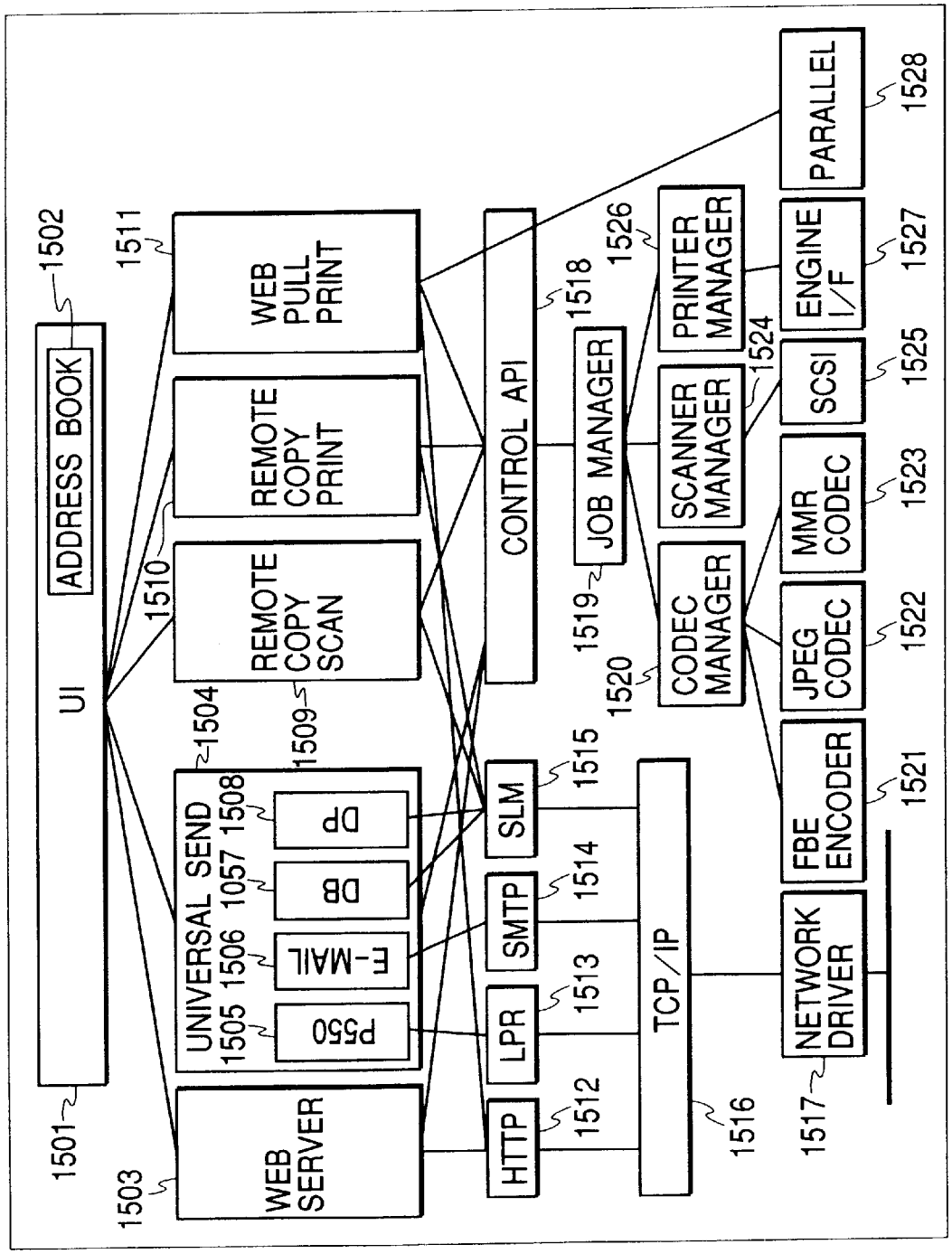
FIG. 2 is a block diagram showing software of the image processing apparatus of the embodiment.

FIG. 2 is a block diagram showing the software of the image processing apparatus 1001 of the embodiment. It should be noted that the software has been stored in the ROM 2003 and is executed by the CPU 2001.

A UI (user interface) 1501 is the module which mediates devices when an operator performs various operations and settings for the image processing apparatus 1001. The UI 1501 transfers input information to later-described various modules to request processes, perform data setting and the like in accordance with operator's handling.

An address book 1502 is the database module which manages data transmission destinations, communication destinations and the like. The contents of the address book 1502 are added, deleted and obtained based on the instruction from the UI 1501, and this address book 1502 is used to send data transmission destination information and communication destination information to each module by the operator's handling.

A web server 1503 is the module which is used to notify the management information of the image processing apparatus 1001 in response to a request from a not-shown web client. The management information is read through a later-described control API (application program interface) 1518, and then notified to the web client through an HTTP (hypertext transfer protocol) 1512, a TCP/IP (transmission control protocol/Internet protocol) 1516 and a network driver 1517 (all described later).

A universal send 1504 is the module which controls data distribution. Namely, the universal send 1504 distributes the data indicated by the operator through the UI 1501 to a similarly indicated communication (output) destination.

Further, when the operator indicates by using the scanner function of the image processing apparatus 1001 to generate the distribution data, the device is operated through the later-described control API 1518 to generate the data.

A printer (P550) 1505 is the module which is executed when the printer 2095 is designated as the output destination in the universal send 1504.

An E-mail 1506 is the module which is executed when an E-mail address is designated as the communication destination in the universal send 1504.

A DB 1507 is the module which is executed when a database is designated as the output destination in the universal send 1504.

A DP 1508 is the module which is executed when an image processing apparatus 1001 similar to the image processing apparatus 1001 of the embodiment is designated as the output destination in the universal send 1504.

A remote copy scan 1509 is the module which uses the scanner function of the image processing apparatus 1001, designates another image processing apparatus 1001 connected by the network or the like as the input destination, and performs the process equivalent to the copy function realized by the image processing apparatus 1001 unit of the embodiment.

A remote copy print 1510 is the module which uses the printer function of the image processing apparatus 1001, designates another image processing apparatus connected by the network or the like as the input destination, and performs the process equivalent to the copy function realized by the image processing apparatus 1001 unit of the embodiment.

A web pull print 1511 is the module which reads and prints the information of various home pages on the Internet or the intranet.

The HTTP 1512 is the module which is used when the image processing apparatus 1001 performs communication based on a communication protocol HTTP. The HTTP 1512 provides communication to the web server 1503 and the web pull print 1511 on the basis of the TCP/IP 1516.

An LPR 1513 is the module which provides communication to the printer 1505 in the universal send 1504 on the basis of the TCP/IP 1516.

An SMTP 1514 is the module which provides communication to the E-mail 1506 in the universal send 1504 on the basis of the TCP/IP 1516.

An SLM 1515 is the salutation-manager module which provides communication to the DB 1507 and the DP 1508 in the universal send 1504, and the remote copy scan 1509 and the remote copy print 1510, on the basis of the TCP/IP 1516.

The TCP/IP 1516 is the modulation which provide network communication to the above various modules on the basis of the later-described network driver 1517.

The network driver 1517 is the module which controls the part physically connected to the network.

The control API 1518 is the module which provides the interface between the upstream modules such as the universal send 1504 and the like and the downstream modules such as a later-described job manager 1519 and the like. Further, the control API 1518 reduces the dependence between the upstream modules and the downstream modules, and improves appropriation of each module.

The job manager 1519 is the module which interprets the processes indicated by the various modules through the control API 1518, and issues instructions to later-described modules. Further, the job manager 1519 integrally manages hardware processes to be performed in the image processing apparatus 1001.

A codec manager 1520 is the module which manages and controls various data compression and decompression in the process instructed by the job manager 1519.

An FBE encoder 1521 is the module which compresses the data read in the scan process performed by the job manager 1519 and a scanner manager 1524, according to an FBE (first binary encoding) format.

A JPEG codec 1522 is the module which performs JPEG compression to the read data and JPEG decompression to print data in the scan process performed by the job manager 1519 and the scanner manager 1524 and in the print process performed by the printer manager 1526.

An MMR codec 1523 is the module which performs MMR compression to the read data and MMR decompression to print data in the scan process performed by the job manager 1519 and the scanner manager 1524 and in the print process performed by the printer manager 1526.

The scanner manager 1524 is the module which manages and controls the scan process instructed by the job manager 1519.

A SCSI (small computer system interface) 1525 is the module which acts as the scanner driver and communicates between the scanner manager 1524 and the scanner unit internally connected to the image processing apparatus 1001.

An engine I/F 1527 is the module which acts as the printer driver and provides the interface between a printer manager 1526 and the print unit.

A parallel 1523 is the module which acts as the parallel port driver and provides the interface when the web pull print 1511 outputs the data to external output devices through the parallel port.

Applications

Hereinafter, the setup applications of the embodiment will be explained with reference to the drawings.

Figure 13:
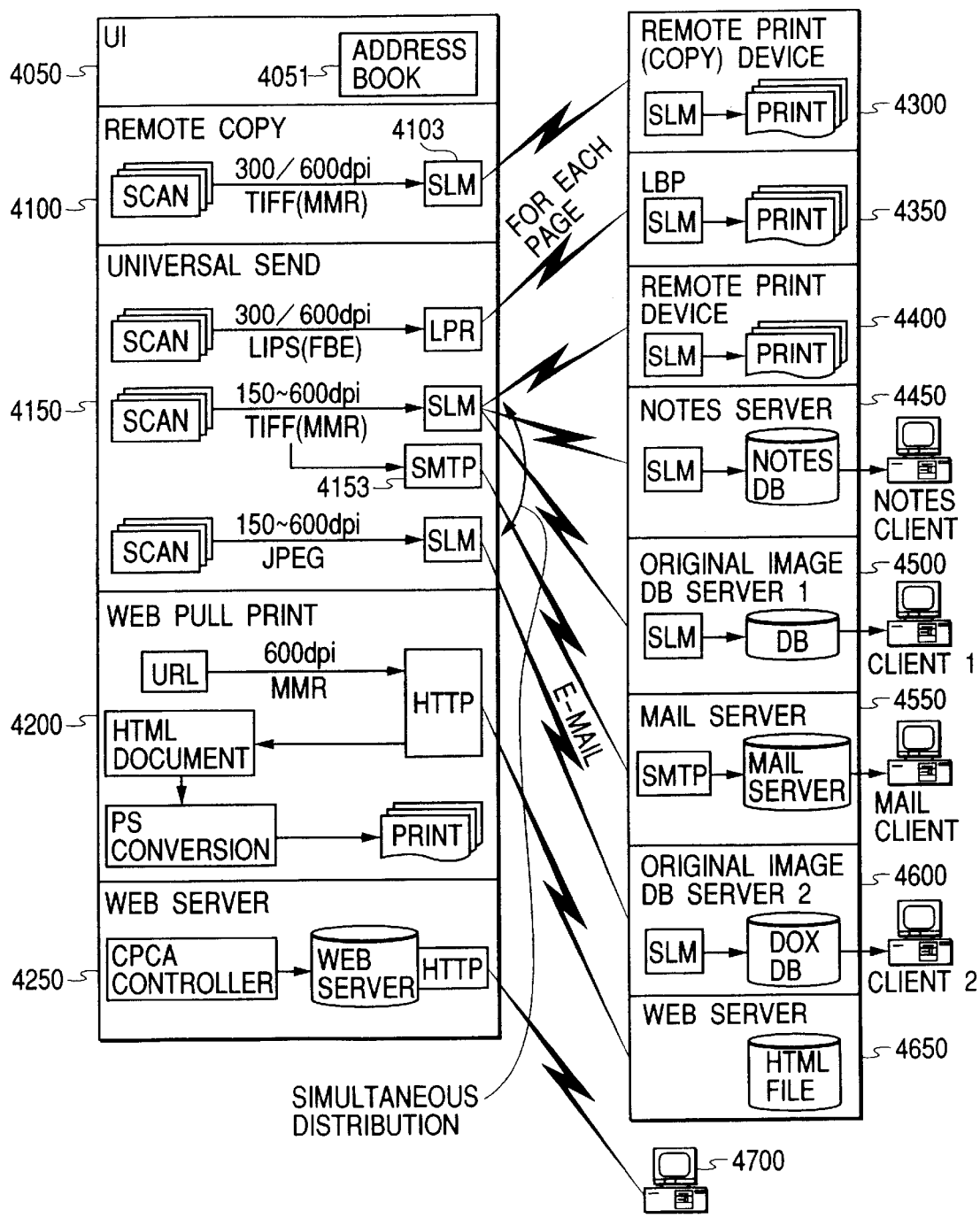
FIG. 13 is a diagram for explaining a setup application block concerning distribution of the embodiment.

FIG. 13 is a diagram for explaining the setup application block concerning the distribution of the embodiment.

A block 4050 indicates the application of the operation unit of the embodiment explained in FIG. 5.

A block 4100 indicates the transmission side of the remote copy application.

A block 4150 indicates the transmission side of the broadcasting distribution. A block 4200 indicates the web pull print module.

A block 4250 indicates the web server module.

A block 4300 indicates the reception side (print side) of the remote copy.

A block 4350 indicates the state that the image transmitted by the broadcasting distribution is received and printed by an all-purpose printer.

A block 4400 indicates the reception side (print side) of the remote print.

A block 4450 indicates the state that the image transmitted by the broadcasting distribution is received and printed by a known Notes server.

A block 4500 indicates the state that the binary image transmitted by the broadcasting distribution is received and stored.

A block 4550 indicates the state that the image transmitted by the broadcasting distribution is received and stored by a known mail server.

A block 4600 indicates the state that the multivalue image transmitted by the broadcasting distribution is received and stored.

A block 4650 indicates the known web server including the information contents.

A block 4700 indicates the known web browser which accesses the web server or the like in the embodiment.

Hereinafter, the application group will be explained in detail while comparing it with each block.

User Interface Application

The details of the UI indicated by the block 4050 are as shown in the above. Here, an address book 4051 will be explained.

The address book 4051 has been stored in a nonvolatile storage (e.g., a nonvolatile memory, or a hard disk) in the image processing apparatus 1001 of the embodiment. Concretely, the feature of each device connected on the network has been described in the storage.

For example, such the feature includes following items:
- a formal name or an alias name of the device;
- a network address of the device;
- a network protocol processible by the device;
- a document format processible by the device;
- a compression type processible by the device;
- an image resolution processible by the device;
- a feedable sheet size and feedable sheet feed stage information in case of the printer device; and
- a name of the folder capable of storing documents in case of the server (computer) device.

In the following application, the feature of the distribution destination can be discriminated on the basis of the above information described in the address book 4051.

The address book 4051 can be edited. Also, the address book stored in the server computer or the like in the network can be downloaded for use and directly referred.

Remote Copy Application

The remote copy application 4100 discriminates from the address book 4051 the image resolution processible by the device designated as the distribution destination, compresses the binary image read by the scanner in the known MMR compression in accordance with the discriminated result, performs a known TIFF (tagged image file format) operation to the compressed data, and transmits the processed data to the printer device on the network through an SLM 4103.

The SLM 4103 is a kind of the network protocol which includes the known device control information such as salutation manager or smart link manager.

Broadcasting Distribution Application

Unlike the above remote copy application, the broadcasting distribution application 4150 can transmit the image to the plural distribution destinations by one-time image scan. Further, the distribution destination is not limited to the printer device. Namely, the broadcasting distribution application 4150 can directly distribute the image to a so-called server computer.

Hereinafter, the broadcasting distribution will be explained in due order according to the distribution destinations.

When it is discriminated from the address book 4051 that the device at the distribution destination can process an LPD (line printer daemon) being the known network printer protocol and an LIPS (LBP (laser beam printer) image processing system) known ad the printer control command, the image is read according to the image resolution similarly discriminated from the address book 4051, the read image itself is compressed according to the FBE format, the compressed image is encoded according to the LIPS, and the encoded data is transmitted to the partner's device according to the LPR being the known network printer protocol.

When the device at the distribution destination can perform communication according to the SLM and is a server device, the server address and the designation of the folder in the server are designated from the address book 4051. Then, similar to the remote copy application 4100, the binary image in the image read by the scanner can be compressed in the known MMR compression, the known TIFF operation can be performed to the compressed data, and the processed data can be stored in the specific folder in the server device on the network through the SLM.

In the device of the embodiment, when the server being the partner's device discriminates to be able to process the known JPEG-compressed multivalue image, it is possible to perform the process similar to that for the above binary image. Namely, the multivalue image in the image read by the scanner can be compressed in the known JPEG compression, a known JFIF (JPEG file interchange format) operation can be performed to the compressed data, and the processed data can be stored in the specific folder in the server device on the network through the SLM.

When the device at the distribution destination is the E-mail server, the mail address described in the address book 4051 is discriminated. Then, the binary image in the image read by the scanner is compressed in the known MMR compression, the known TIFF operation is performed to the compressed data, and the processed data is transmitted to the E-mail server according to a known SMTP (simple mail transfer protocol) 4153. The distribution after then is performed according to the mail server 4550.

Web Pull Print Application

Since the web pull print application 4200 is not directly relative to the embodiment, the explanation thereof will be omitted.

Web Server Application

Since the web server application 4250 is not directly relative to the embodiment, the explanation thereof will be omitted.

Operation Screen

Figure 14:
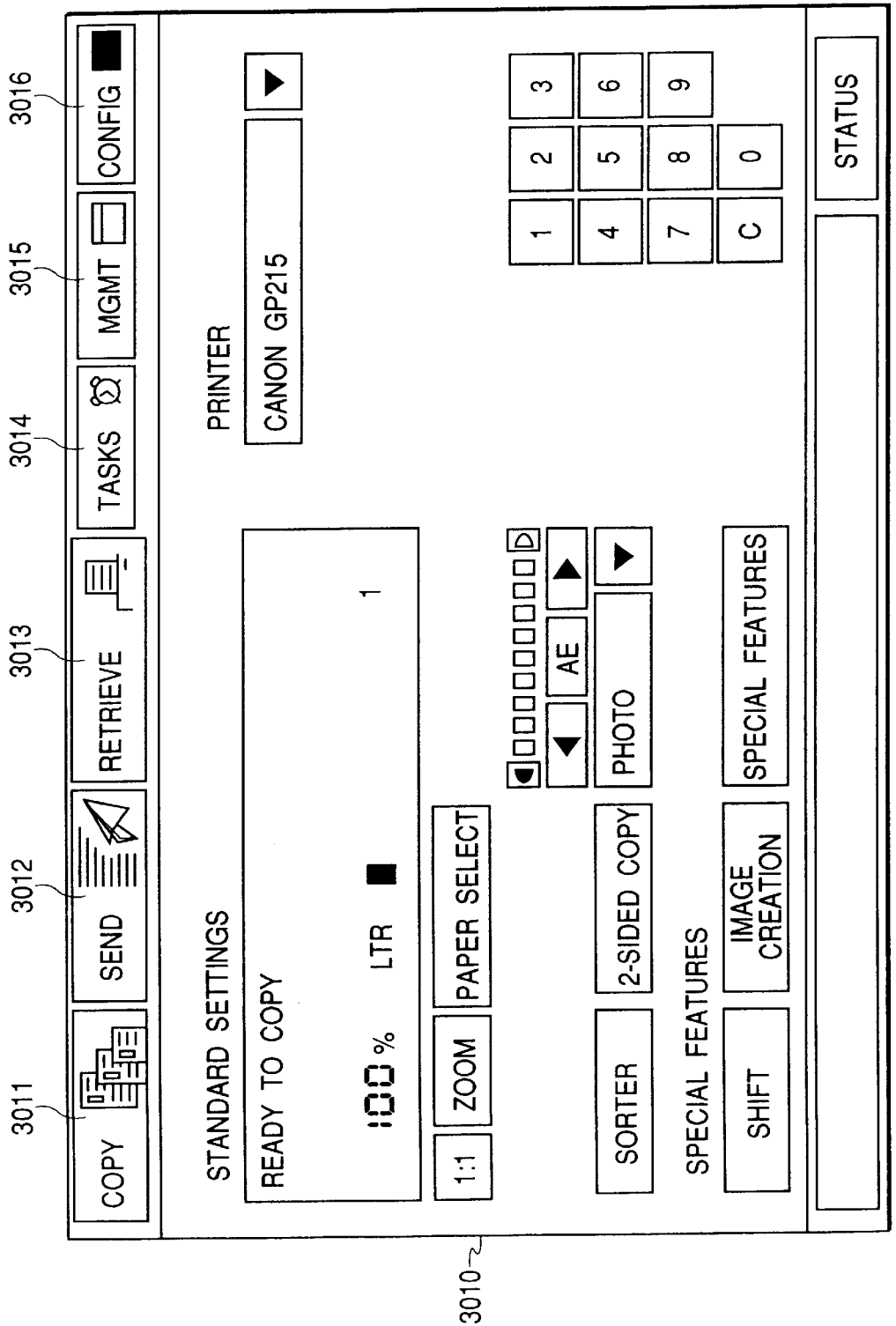
FIG. 14 is a diagram for explaining an operation screen of a copy operation by way of example.

FIG. 14 is a diagram showing the operation screen of a copy operation by way of example.

The function provided by the image processing apparatus 1001 of the embodiment can be classified into six large categories, i.e., a copy function, a send function, a retrieve function, a tasks function, a management function and a configuration function. These functions respectively correspond to six main tabs ("COPY" 3011, "SEND" 3012, "RETRIEVE" 3013, "TASKS" 3014, "MGMT" 3015, and "CONFIG" 3016) which are displayed at the upper part of an operation screen 3010.

By depressing the main tab, the screen of one category is changed to the screen of another category. When it is not permitted to change the screen, the displayed color of the main tab is changed, and this main tab does not react even if it is touched.

The copy function includes the function to perform ordinary document copying by using the scanner 2070 and the printer 2095 of the image processing apparatus 1001 and the function (remote copy function) to perform document copying by using the scanner 2070 of the image processing apparatus 1001 and the printer connected through the network.

The send function is the function to transfer the document set on the scanner of the image processing apparatus 1001 for the E-mail, the remote printer, the fax, the file transfer (FTP) and the database. Namely, the plural destinations can be set.

The retrieve function is the function to capture an external document and print it by the printer 2095 of the image processing apparatus 1001. When capturing the document, the retrieve function can use the WWW (World Wide Web), the E-mail, the file transfer and the fax.

The tasks function is the function to generate and manage the task for automatically processing the externally sent document such as an Internet print or the like and regularly performing retrieve.

The management function is the function to manage the job, the address book, a bookmark, a document, account information and the like.

The configuration function is the function to perform the setting concerning the image processing apparatus 1001 itself (a network, a timer, etc.).

DIS (Device Information Service)

In the controller, the database which stores the setting value for the job, the function of the device (the scanner, the printer or the like), the status, the account information and the like in the form of the data according to the control API 1518, and the interface which interfaces such the database are defined as the DIS.

Figure 15:
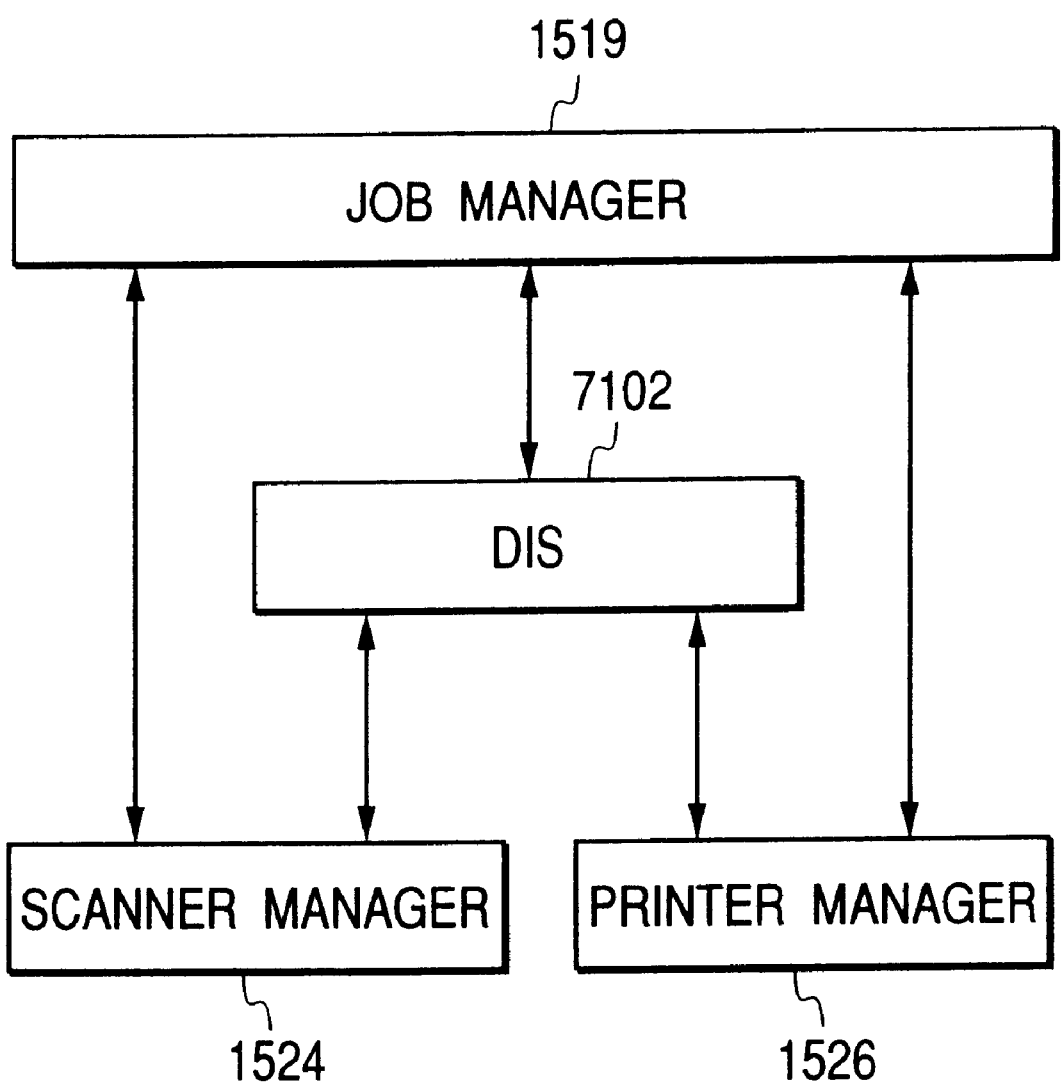
FIG. 15 is a diagram showing data exchange among a DIS (device information service) 7102, a job manager 1519, a scanner manager 1524 and a printer manager 1526.

FIG. 15 is a diagram showing data exchange among a DIS 7102, a job manager 1519, a scanner manager 1524 and a printer manager 1526.

Basically, the dynamic information such as a job start instruction or the like is directly transferred from the job manager 1519 to each manager, and the static information such as a device function, a job content or the like is obtained by referring to the DIS 7102. The static information, the dynamic information and the event from each manager are transferred to the job manager 1519 through the DIS 7102.

When data setting and data capture are performed from each manager to the database of the DIS 7102, since the internal data format of the DIS 7102 is according to the control API, a conversion process between the data format according to the control API 1518 and the data format acceptable by each manager is performed.

For example, when the status data is set from each manager, the data inherent in the device is interpreted, the interpreted data is converted into the corresponding data defined by the control API 1518, and the converted data is written in the database of the DIS 7102.

When data setting and data capture are performed from the job manager 1519 to the database of the DIS 7102, any conversion process between the job manager 1519 and the DIS 7102 is not performed.

In the DIS 7102, the event data is updated based on various event information notified from each manager.

Figure 16:
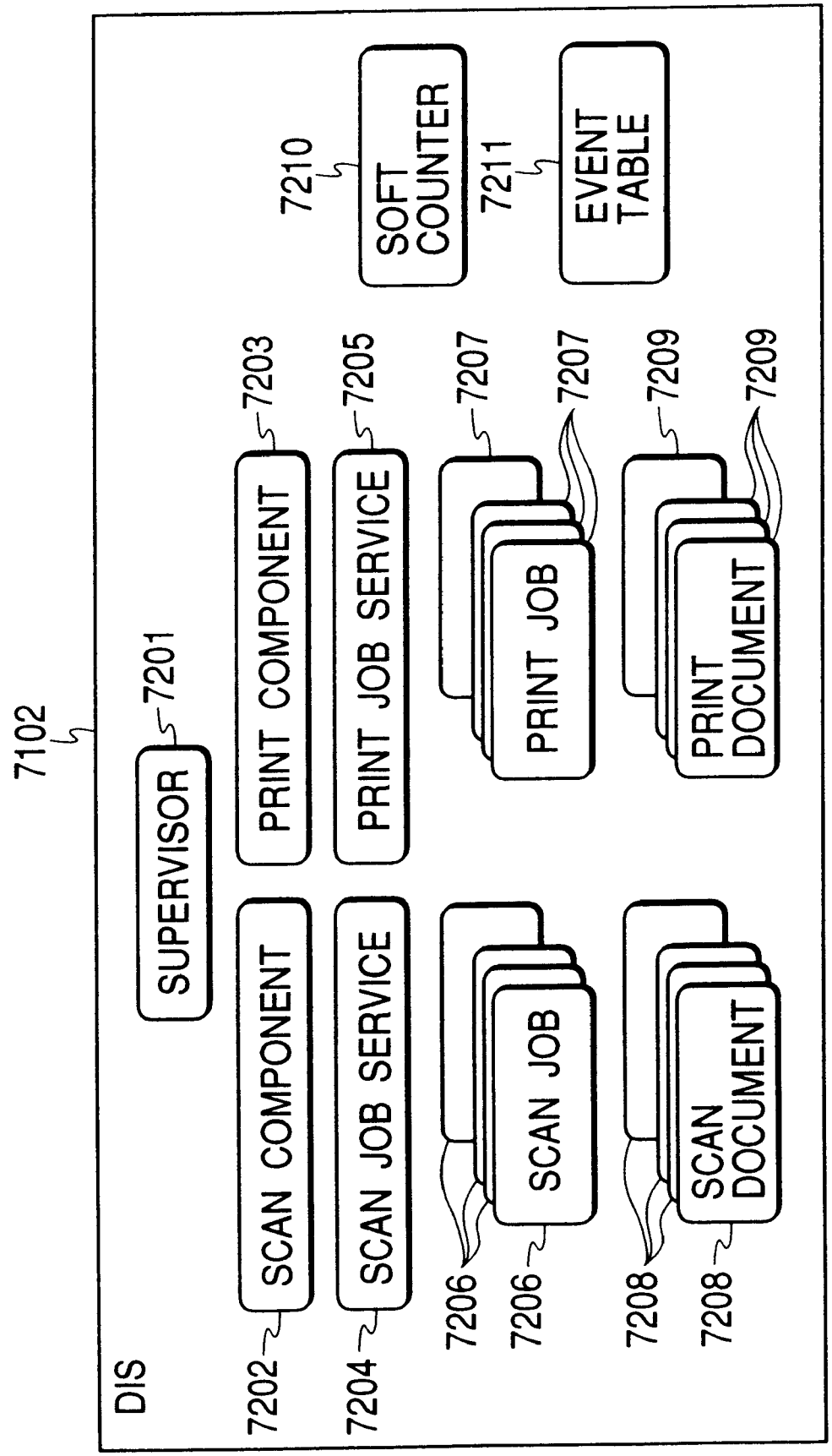
FIG. 16 is a diagram for explaining various databases and counters stored in the DIS 7102 of the embodiment.

FIG. 16 is a diagram for explaining various databases (hereinafter called DB's) stored in the DIS 7102, and each DB will be explained. In FIG. 16, the round corner rectangles represent respective DB's.

Numeral 7201 denotes a supervisor DB which stores the status for the entire apparatus and the user information. The information such as a user ID, a password or the like for which backup is necessary is stored in a nonvolatile storage such as an HD (hard disk), a backup memory or the like.

Numeral 7202 denotes a scan component DB, and numeral 7203 denotes a print component DB. Each of these component DB's is stored in correspondence with each component existing.

For example, in the case where the apparatus includes only the printer, only the print component DB 7203 exists. Further, in the case where the apparatus includes a fax machine, a fax component DB is stored. When each component DB is initialized, the corresponding manager sets the component function and the status.

Numeral 7204 denotes a scan job service DB, and numeral 7205 denotes a print job service DB. Similar to the component DB, when each job service DB is initialized, the corresponding manager sets the usable function and its support condition.

Next, job and document DB's will be explained. Numeral 7206 denotes scan job DB's, numeral 7207 denotes print job DB's, numeral 7208 denotes scan document DB's, and numeral 7209 denotes print document job DB's.

The job DB and the document DB are dynamically secured and initialized by the job manager 1519 every time the job and its accompanied document are created, and the necessary items are set.

Before the job process is started, each manager reads the necessary items from the job DB and the document DB, and the job is then started. After the job ended, the DB's of these job and their accompanied documents are released. Since the job has one or more documents, the plural document DB's might be secured for the certain job.

A soft counter DB 7210 is the counter table which is used to record the number of scans of the apparatus and the number of print operations of the apparatus, and an event table DB 7211 is the DB which stores the event information notified from each manager.

The events notified from the managers include the component state transition, the scan operation end and the various errors from the scanner manager 1524, and the component state transition, the print operation end, the jam and the sheet feed cassette opening from the printer manager 1526, and the like.

When the event is generated by the manager, the DIS 7102 registers the ID of the generated event and, if necessary, the detailed data accompanied with this event, on the event table DB 7211. Further, when the event release is notified by the manager, the event data designated to be released is deleted from the event table DB 7211.

When the event polling is performed by the job manager 1519, the DIS 7102 refers to the event table DB 7211, and returns the ID of the currently generated event and, if necessary, the detailed data accompanied with this event to the job manager 1519. Conversely, when the event is not currently generated, the DIS 7102 returns such the fact.

When the events of the scan operation end and the print operation end are notified, the counter values of the users who performed the scan and print operations are updated. Whenever the counter is updated, the counter value is rewritten to a backed-up nonvolatile memory such as a memory, a hard disk or the like, such that the counter value is not lost due to unexpected power supply interception or the like.

Scan Operation

Figure 17:
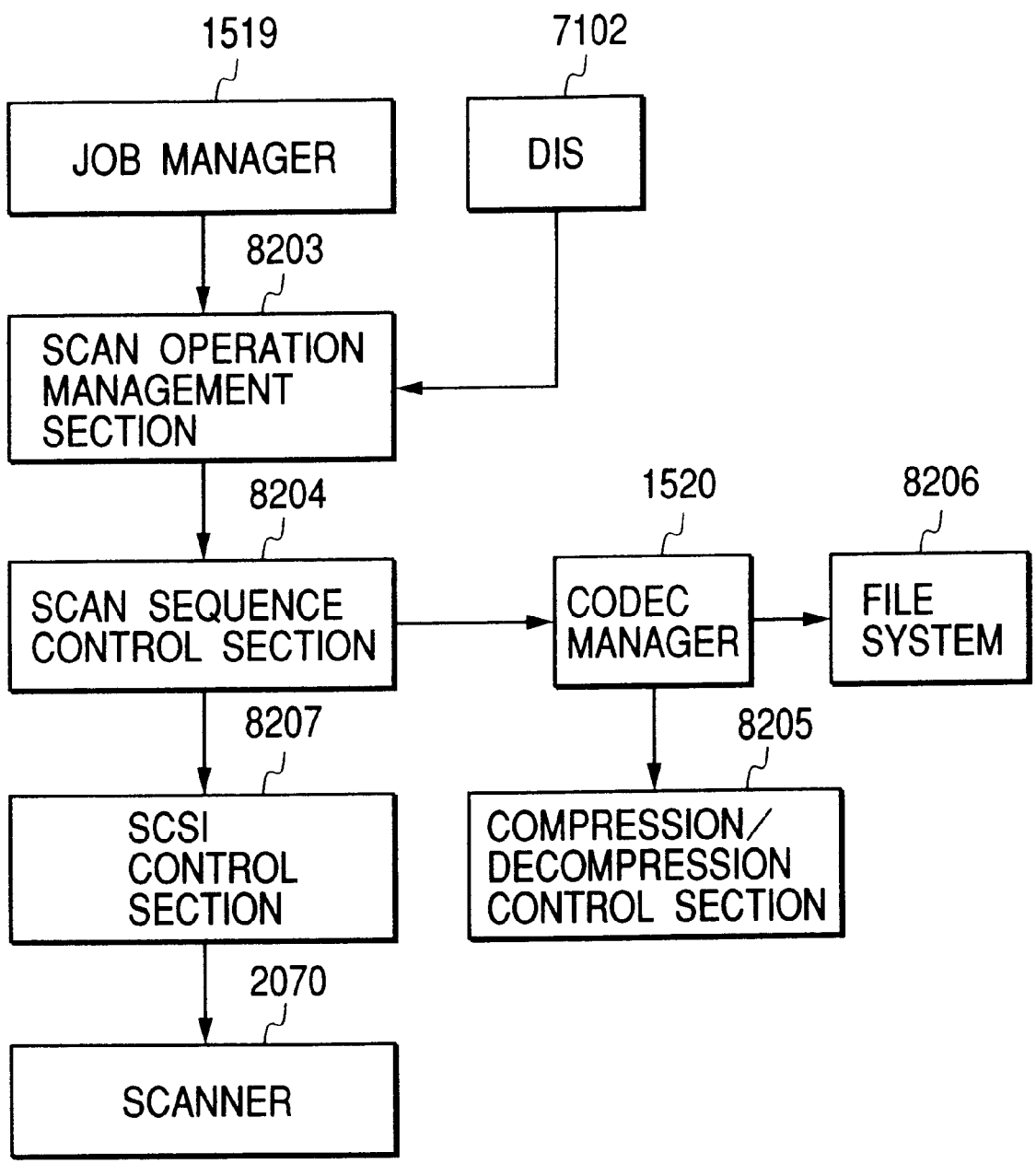
FIG. 17 is a block diagram for explaining the software structure concerning an scan operation of the embodiment.

FIG. 17 is a block diagram for explaining the software structure concerning the scan operation. The job manager 1519 has the function to classify and store application level requests, and the DIS 7102 stores parameters necessary for the scan operation from the application levels.

The request from the application is stored in the RAM 2002. A scan operation management section 8203 captures the information necessary to perform the scan, from the job manager 1519 and the DIS 7102.

Figure 18:
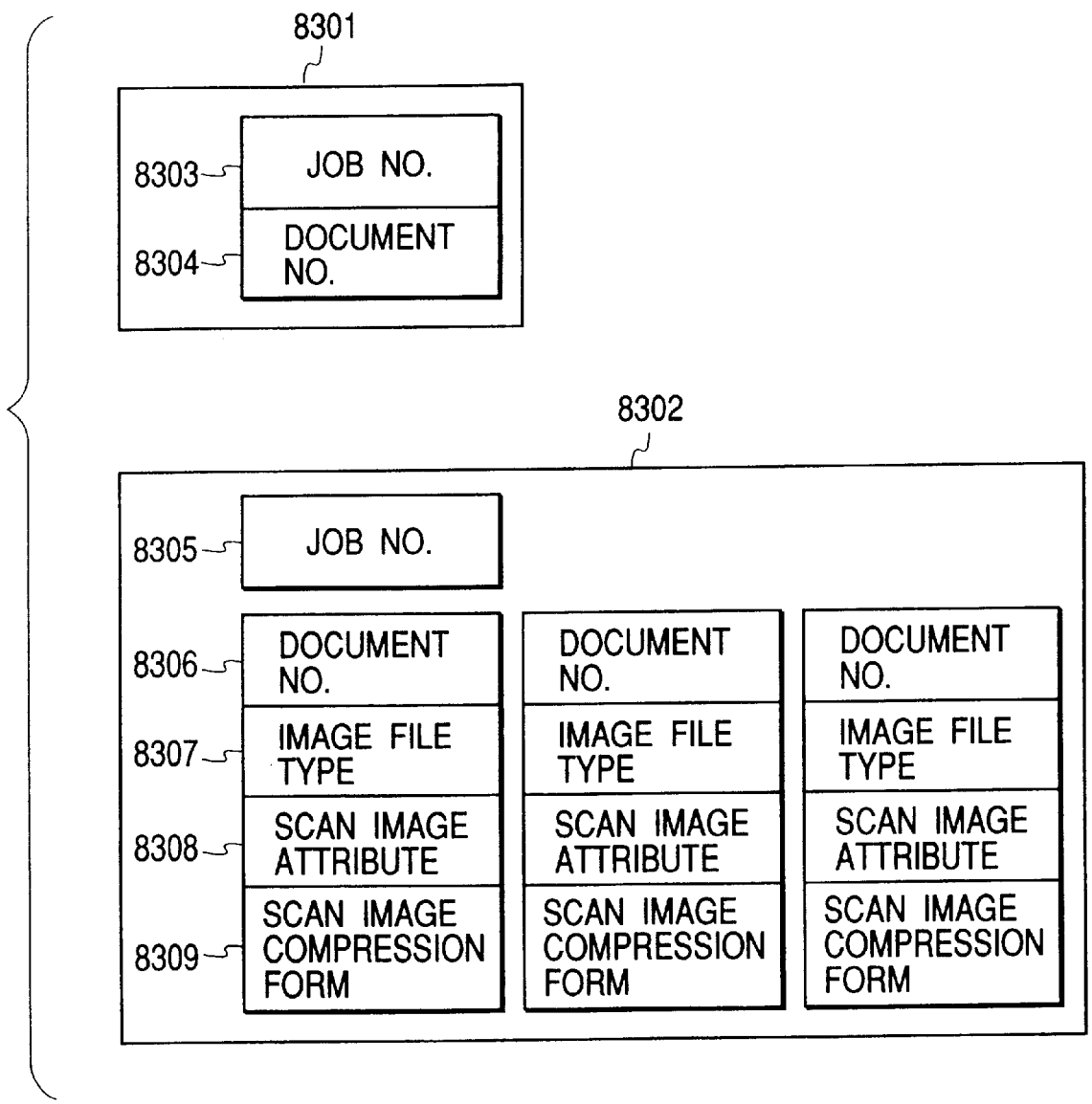
FIG. 18 is a schematic diagram of a parameter table used in a scan of the embodiment.

The scan operation management section 8203 receives table data 8301 of FIG. 18 composed of a job number 8303 and a document number 8304 from the job manager 1519. Then, on the basis of the table data 8301 composed of the job number 8303 and the document number 8304, the scan operation management section 8203 receives a scan parameter 8302 from the DIS 7102. Thus, the scan is performed based on the scan condition requested from the application.

The scan operation management section 8203 gives the scan parameter 8302 captured from the DIS 7102 to a scan sequence control section 8204 in the order of document number. The scan sequence control section 8204 which received the scan parameter 8302 controls a SCSI control section 8207 in accordance with the content of a scan image attribute 8308.

Thus, by operating the device I/F unit 2020 connected to the image bus 2008 of FIG. 3, the control command is transferred to the scanner 2070 through the cable (the raster image data) 2071, whereby the scan operation is performed. The image subjected to the scan is given to the device I/F 2020 through the cable 2071, and further stored in the RAM 2002 through the image bus 2008.

At the time when the scan operation ends and the image is stored in the RAM 2002 through the image bus 2008, the scan sequence control section 8204 issues a request to the codec manager 1520 to compress the scan image stored in the RAM 2002, in accordance with the content of a scan image compression format 8309.

The codec manager 1520 which received the request performs data compression based on the designation of the scan image compression format 8309 from the scan sequence control section 8204, by using the image compression processing unit 2040 connected to the image bus 2008 and a software compression module in the parallel (MMR codec) 1523. A compression/decompression control section 8205 stores the compressed image in the RAM 2002 through the image bus 2008.

The scan sequence control section 8204 compresses the scan image to the format designated by the codec manager 1520 according to the scan image compression format 8309, and stores the compressed image in the RAM 2002. Then, the scan sequence control section 8204 creates a file of the compressed scan image stored in the RAM 2002, in accordance with an image file type 8307 of the scan parameter 8302.

The scan sequence control section 8204 requests a file system 8206 to create a file according to the file format designated by the image file type 8307 of the scan parameter 8302.

The file system 8206 creates the file of the compressed image stored in the RAM 2002 in accordance with the image file type 8307 from the scan sequence control section 8204, and transfers the file to the HDD 2004 through the image bus 2008, whereby the file of the compressed image scanned is created.

At the time when the file of the image is stored in the HDD 2004 by the file system 8205, the scan sequence control section 8204 considers that the process for the original of one sheet on the scanner 2070 ends, and thus returns a scan end notification to the scan operation management section 8203.

At this time, if the original not yet scanned exists on the scanner 2070 and the scan request from the job manager 1519 still exists, the scan operation is again requested to the scan sequence control section 8204 by using the scan parameter 8302 stored in the DIS 7102.

On the other hand, if the original not yet scanned does not exist on the scanner 2070 or the scan request from the job manager 1519 does not exist, it is considered that the scan operation ends, and a scan end notification is issued to the job manager 1519.

Print Operation

Hereinafter, the print operation will be explained in detail.

The device I/F 2020 which contains a DPRAM (dual-port RAM) performs parameter setting to the printer 2095, state reading from the printer 2095 and print command exchange, through this DPRAM. Namely, the information (including sheet feed cassette designation, face-up/face-down sheet discharge designation, and sheet discharge destination designation) to be transferred to the printer 2095 and the information transferred from the printer 2095 are written on the DPRAM in the device I/F 2020. The information written on the DPRAM is read by the CPU 2001 (the printer manager 1526) and the printer 2095.

The device I/F 2020 further contains a video controller. Thus, the device I/F 2020 transfers the image data expanded on the image bus 2008 to the printer 2095 through the engine I/F cable (raster image data) 2096 in synchronism with a VCLK (video clock) and an HSYNC (horizontal synchronization signal) given through the engine I/F cable 2096.

Figure 19:
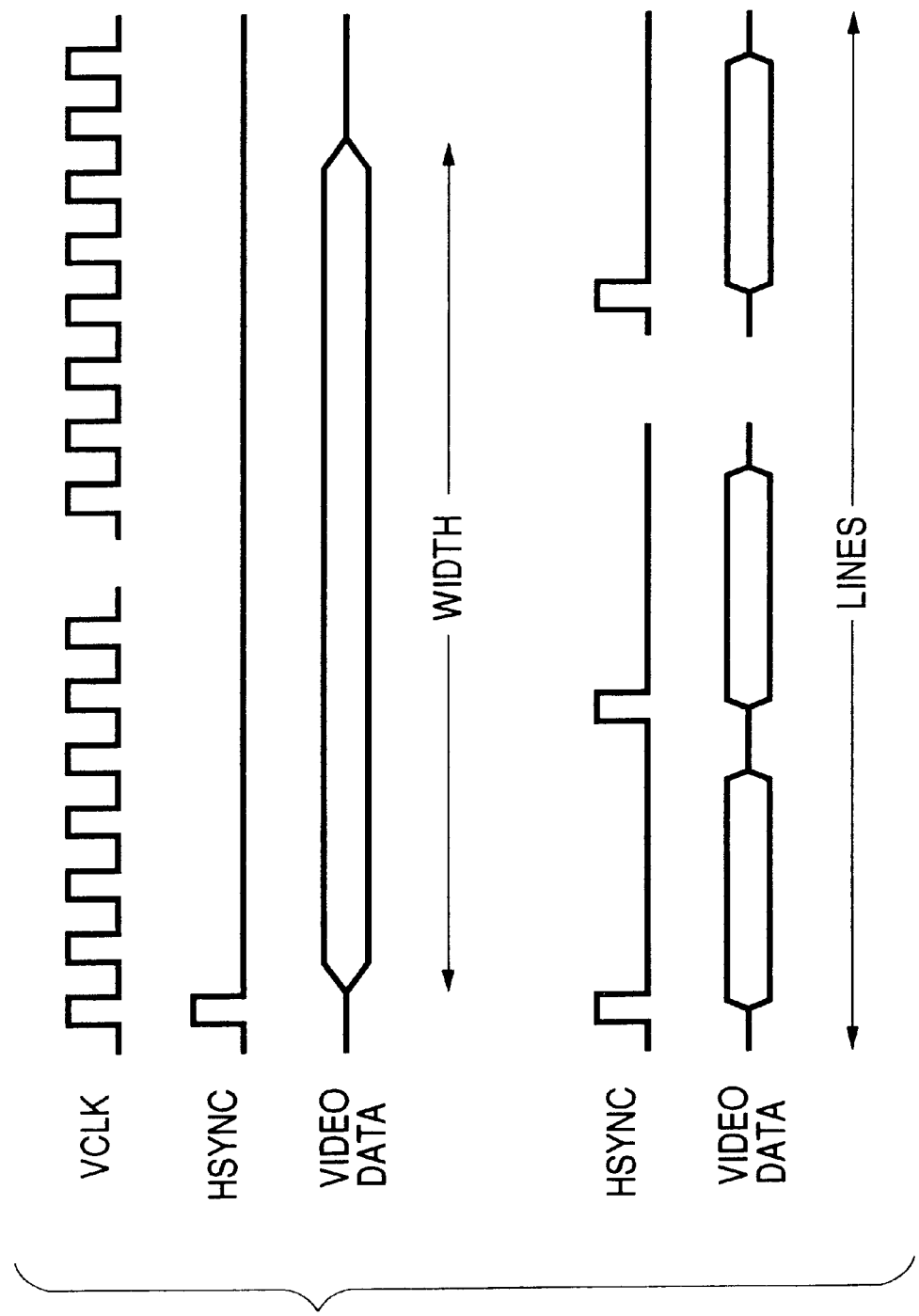
FIG. 19 is a timing chart showing transfer timing of print image data of the embodiment.

FIG. 19 is a timing chart showing the transfer timing of the print image data. The VCLK is continuously generated, and the HSYNC is generated in synchronism with the start of one-line printing of the printer 2095. The video controller reads the data of the set image width (WIDTH) from the RAM 202 and output the read data as a video signal to the engine I/F cable 2096. After the above operation is repeated several times corresponding to the designated lines (LINES), an IMAGE_END interruption command is generated.

As previously explained, when the print job instruction is given from the application program on the CPU to the control API 1518, the control API 1518 gives it as the job to the job manager 1519 being the controller level.

Further, the job manager 1519 stores the job setting in the DIS 7102, and instructs the printer manager 1526 to start the job. The printer manager 1526 which accepted the job reads the information necessary to execute the job from the DIS 7102, and sets the read information to the printer 2095 through an engine I/F board and the DPRAM.

When the image has been compressed, the codec manager 1520 is requested to decompress (or expand) it. Thus, according to this request, the codec manager 1520 expands the image file into a bitmapped image by the expansion method (JPEG, MMR or the like) indicated by the printer manager 1526. The expanded image is stored in the RAM 2002.

FIG. 20 shows the setting items of the device I/F 2020, and FIG. 21 shows the setting items, the control commands and the status commands through the DPRAM of the printer 2095.

The printing of the bitmapped image will be concretely explained, on the assumption that a letter-sized (11×8.5 inches) binary image of two pages is printed one copy by the printer 2095 of 600 dpi.

After the image expansion ended, the printer manager 1526 calculates the number of image bytes of the width of this image (the side of 8.5 inch in this case), as follows.

$$\text{WIDTH} = 8.5 \times 600/8 \approx 630 \text{ (bytes)}$$

Next, the number of lines is calculated as follows.

$$\text{LINES} = 11 \times 600 \times 6600 \text{ (lines)}$$

These calculated values and the source address (SOURCE) of the RAM 2002 at which the given image of first page has been stored are set to the items WIDTH, LINES and SOURCE shown in FIG. 20.

At this point, the device I/F 2020 has ended the preparation for the image output, but the HSYNC signal is not yet transferred from the printer 2095 (though the VCLK signal has been already transferred), whereby the image data is not output.

The printer manager 1526 writes "1" as the number of output copies at the predetermined address (BookNo) on the DPRAM shown in FIG. 21, and then issues the feed request (FEED_REQ) of the output sheet for the first page. This feed request (FEED_REQ) includes the feed cassette designation, the face-up/face-down sheet discharge designation, and the sheet discharge destination designation. The printer manager 1526 which issued the request (FEED_REQ) waits for the image request (IMAGE_REQ) from the printer 2095. When the image request (IMAGE_REQ) is transferred from the printer 2095, the printer manager 1526 issues the image start command (IMAGE_START).

When the image start command (IMAGE_START) is received, the printer 2095 begins to generate the HSYNC signal, and the device I/F 2020 which waited for the HSYNC signal outputs the image. When the trailing edge of the output sheet is detected, the printer 2095 outputs the image end command (IMAGE_END). Then, when the output sheet is discharged, the printer 2095 outputs the sheet output command (SHEET_OUT).

The printer manager 1526 which received the image end command (IMAGE_END) of the first page sets the items WIDTH, LINES and SOURCE for the second page to the engine I/F board, issues the request (FEED_REQ), and waits for the image request (IMAGE_REQ). The operation after the image request (IMAGE_REQ) for the second page was received is the same as that for the first page.

Figure 22:
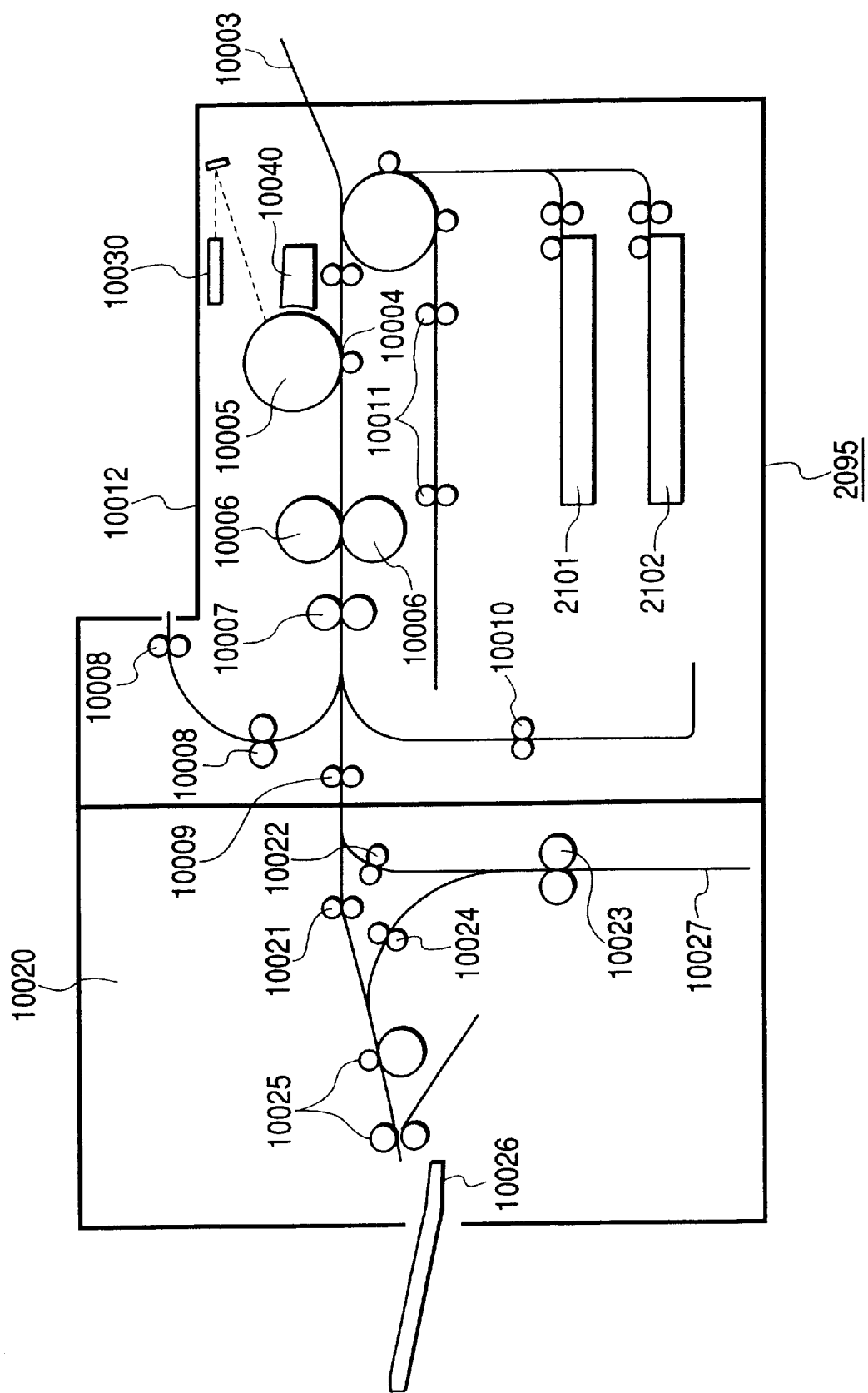
FIG. 22 is a diagram for explaining recording sheet transportation paths of the embodiment.

Next, transportation paths (or routes) of the recording sheet will be explained separately at a case of one-faced printing and two-faced printing. FIG. 22 is a diagram for explaining the recording sheet transportation paths in the printer 2095. A finisher 10020 is connected to the printer 2095. The recording sheet is discharged to a center tray 10012 of the printer 2095 or to a sheet discharge tray 10026 of the finisher 10020 (a sheet discharge tray 2111 of FIG. 4 when the finisher 10020 is not connected). In the embodiment, the structure to which the image forming according to the electrophotographic method is applied will be explained. In accordance with the image data output from the above printer manager 1526, a latent image is formed on a photosensitive drum 10005 by a laser unit 10030 in the printer 2095, and toner is applied and adhered onto the formed image by a development unit 10040.

In the one-faced printing, in accordance with the request (FEED_REQ) from the printer manager 1526, the recording sheet is fed from any of the upper sheet cassette 2101, the lower sheet cassette 2102 and a manual feed tray 10003 at timing capable of forming the image on the recording sheet, by the printer 2095. Then, the recording sheet is transported to a transfer unit 10004, and the toner adhered on the photosensitive drum 10005 is transferred onto the recording sheet.

The recording sheet on which the toner was transferred is transported to a fixing unit 10006, and the toner is fixed to the recording sheet by heat and pressure of the fixing unit 10006. In the case where the sheet discharge destination has been designated to be the center tray 10012 according to the request (FEED_REQ), after the recording sheet was discharged by a fixing and discharge roller 10007, the sheet is discharged to the center tray 10012 through face-down sheet discharge rollers 10008.

In the case where the sheet discharge destination has been designated to be the sheet discharge tray 10026 of the finisher 10020 and also the face-up sheet discharge has been designated according to the request (FEED_REQ), after the recording sheet was discharged by the fixing and discharge roller 10007, the sheet is discharged to the finisher 10020 through a face-up sheet discharge roller 10009. Then, in the finisher 10020, the sheet is discharged to the sheet discharge tray 10026 through a straight path roller 10021 and sheet discharge rollers 10025.

In the case where the sheet discharge destination has been designated to be the sheet discharge tray 10026 of the finisher 10020 and also the face-down sheet discharge has been designated according to the request (FEED_REQ), after the recording sheet was discharged by the fixing and discharge roller 10007, the sheet is discharged to the finisher 10020 through the face-up sheet discharge roller 10009. Then, in the finisher 10020, the sheet is transported to an inversion path 10027 through an inversion path first roller 10022.

After the recording sheet was transported into the inversion path 10027, a finisher inversion roller 10023 is reversed by the printer 2095 to discharge the sheet to the sheet discharge tray 10026 through an inversion path second roller 10024 and the sheet discharge rollers 10025.

In the two-faced printing, in accordance with the request (FEED_REQ) from the printer manager 1526, the recording sheet is fed from any of the upper sheet cassette 2101, the lower sheet cassette 2102 and the manual feed tray 10003 at timing capable of forming the image on one face of the recording sheet, by the printer 2095. Then, the recording sheet is transported to the transfer unit 10004, and the toner adhered on the photosensitive drum 10005 is transferred onto the recording sheet.

The recording sheet on which the toner was transferred is transported to the fixing unit 10006, and the toner is fixed to the recording sheet by heat and pressure of the fixing unit 10006. The recording sheet passed the fixing unit 10006 is discharged toward the path direction of an inversion roller 10010 by the fixing and discharge roller 10007, the sheet is inverted by the inversion roller 10010, and the inverted sheet is discharged toward the path direction of two-faced print rollers 10011.

At timing capable of forming the image on the other face of the recording sheet, the sheet is transported to the transfer unit 10004 by the two-faced print rollers 10011, and the toner adhered on the photosensitive drum 10005 is transferred onto the recording sheet in the printer 2095.

The recording sheet on which the toner was transferred is transported to the fixing unit 10006, and the toner is fixed to the recording sheet by heat and pressure of the fixing unit 10006. The recording sheet passed the fixing unit 10006 is discharged by the fixing and discharge roller 10007.

In the case where the sheet discharge destination is the center tray 10012, after the sheet was discharged by the fixing and discharge roller 10007, the sheet is discharged to the center tray 10012 through the face-down sheet discharge rollers 10008.

In the case where the sheet discharge destination is the sheet discharge tray 10026 of the finisher 10020 and the face-up sheet discharge has been designated, after the recording sheet was discharged by the fixing and discharge roller 10007, the sheet is discharged to the finisher 10020 through the face-up sheet discharge roller 10009. Then, in the finisher 10020, the sheet is further discharged to the sheet discharge tray 10026 through the straight path roller 10021 and the sheet discharge rollers 10025.

In the case where the sheet discharge destination is the sheet discharge tray 10026 of the finisher 10020 and also the face-down sheet discharge has been designated, after the recording sheet was discharged by the fixing and discharge roller 10007, the sheet is discharged to the finisher 10020 through the face-up sheet discharge roller 10009. Then, in the finisher 10020, the sheet is transported to the inversion path 10027 through the inversion path first roller 10022.

The recording sheet is inverted by the operation of the finisher inversion roller 10023, the inverted sheet is transported by the inversion path second roller 10024, and the sheet is discharged to the sheet discharge tray 10026 through the sheet discharge rollers 10025.

Figure 23:
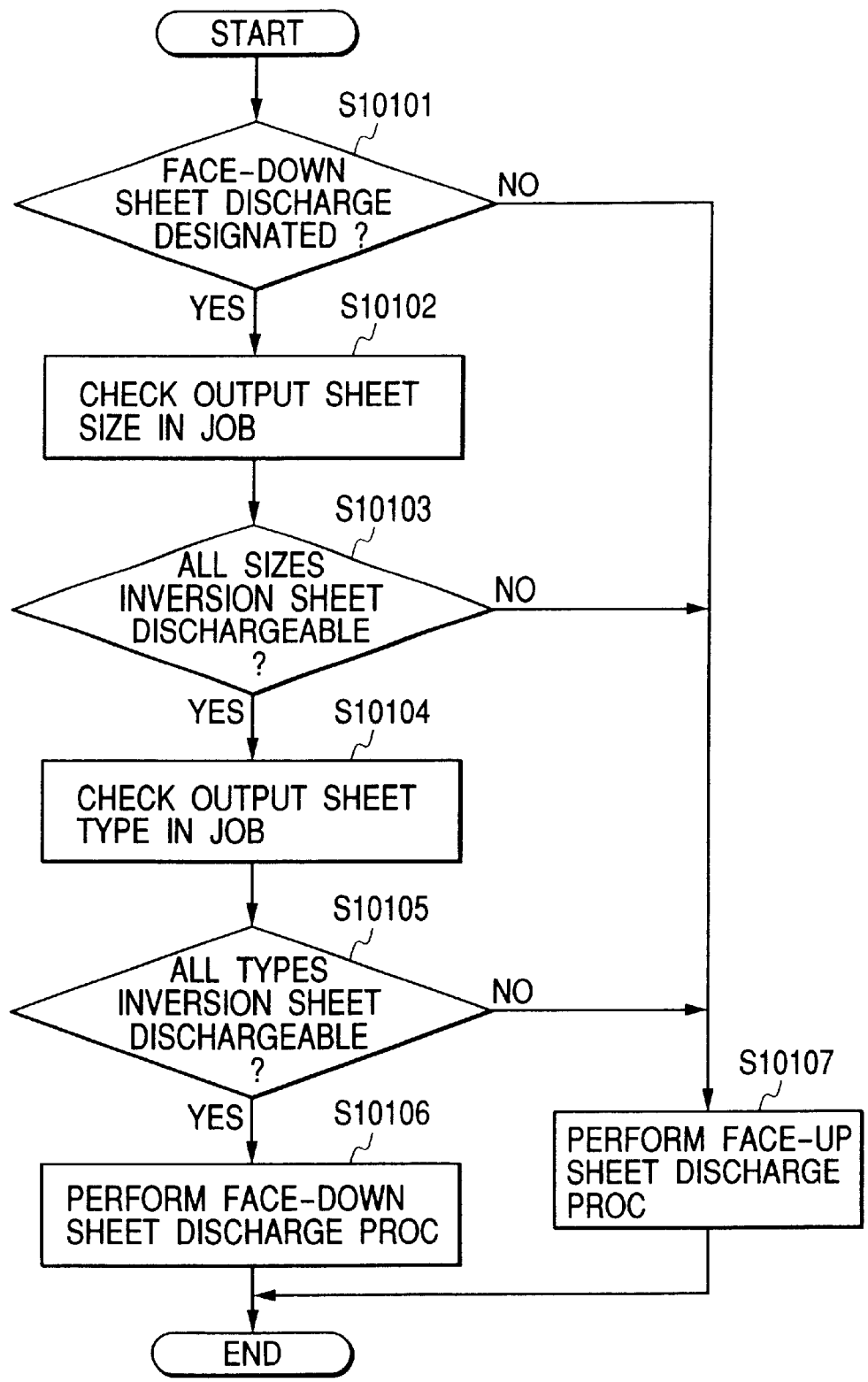
FIG. 23 is a flow chart for explaining a face-up/face-down sheet discharge judgment of the embodiment.

Next, a control procedure according to the embodiment of the present invention will be explained. FIG. 23 is a flow chart for explaining a face-up/face-down sheet discharge judgment. A program for this flow chart has been stored in the ROM 2003 and is actually executed by the CPU 2001. In the software, this procedure is performed by the printer manager 1526. The procedure in this flow chart is performed in a case where the image forming is performed after the data of one job was once stored in the HDD 2004 or the RAM 2002. The case where the image forming is performed after the data of one job was once stored includes, e.g., a case where a continuous reading mode is designated in the copy function, a case where an electronic sort mode is designated in the copy function or the printer function, a case where accumulation printing is designated by the printer driver in the printer function, a case where it is designated to print images accumulated in a memory box function, and the like. The continuous reading mode is the mode that, when it is intended to read the originals of plural types (the mixture of one-faced/two-faced originals, the mixture of common sheet/thick sheet originals, etc.) as one job, until the user indicates the reading of one job to have ended from the operation unit 2012, even if the original feeder 2072 is used, even if the original feeder 2072 is not used, even if a two-faced feed mode or a one-faced feed mode of the original feeder 2072 is changed on the way, or even if each original is read by the scanner 2070 without using the original feeder 2072, all the operations are managed as one job. The electronic sort mode is the mode that, when the image forming for the plural copies is performed, the image forming for a series of pages is repeated plural times. The accumulation printing is the printing mode that the printing is performed by the printer 2095 after the expansion (decompression) for one job completely ended by the RIP unit 2060 so as to prevent that the image processing apparatus 1001 is monopolized for a long time to a time-consuming job for image expansion. The memory box function is the function by which the image read by the scanner 2070 and the image received through the modem (network I/F) 2050 are stored, and then the stored image can be printed by the printer 2095 according to the user's instruction from the operation unit 2012. The job data includes face-up/face-down designation, output sheet size designation for each page in the image forming job, and output sheet type designation for each page in the image forming job. Such the designation information is also stored in the HDD 2004 or the RAM 2002.

In the image forming job to form the image on the recording sheet, when the image forming is performed after the job data (image data) was once accumulated in the HDD 2004 or the RAM 2002, it is first judged in a step S10101 whether or not the face-down sheet discharge is designated. If judged that the face-down sheet discharge is designated, or if judged that both the face-down sheet discharge and the face-up sheet discharge are not designated, the flow advances to a step S10102. Conversely, if judged that the face-up sheet discharge is designated, the flow advances to a step S10107.

In the step S10102, the printer manager 1526 checks the output sheet sizes for all the pages in the image forming job stored in the HDD 2004, and creates the list of the output sheet sizes included in one job as shown in FIG. 24 on the RAM 2002. In FIG. 24, numeral 10201 denotes columns of the sheet sizes including the sheet sizes capable of being output. The sheet sizes capable of being output have been previously stored in the ROM 2003. When the list is created, the printer manager 1526 reads from the ROM 2003 the sheet sizes capable of being output and writes the read sizes into the list on the RAM 2002.

Numeral 10202 denotes columns of the number of output sheets, and each column shows the number of output sheets for each sheet size included in one job. The printer manager 1526 counts the number of output sheets for each sheet size output in one job, and writes the obtained value into the list on the RAM 2002. Numeral 10203 denotes columns of invertibility/uninvertibility confirmation for the recording sheet. Namely, "UNINVETIBLE" is set for the sheet size to which the sheet inversion is unsuitable, while "INVERTIBLE" is set for the sheet size to which the sheet inversion may be performed. As shown in FIG. 24, since the postcard size is small and thus unsuitable for inversion, "UNINVETIBLE" is set. Further, since the free (or arbitrary) size which can accept any sized sheet is often the size unsuitable for inversion, "UNINVETIBLE" is set. The information concerning invertibility/uninvertibility for each sheet size is stored in the ROM 2003. When the list is created, the printer manager 1526 reads from the ROM 2003 the invertibility/uninvertibility information and writes the read information into the list on the RAM 2002. When the list of the output sheet sizes shown in FIG. 24 is completed, the flow advances to a step S10103.

In the step S10103, the columns 10202 of the number of output sheets for the respective sizes are checked on the RAM 2002, and it is judged whether or not the number of output sheets to which "UNINVERTIBLE" has been set is "0" for all the sizes. If there is the counted value "1" or more for even one of the plural uninvertible sizes, i.e., if the job includes the size to which sheet inversion can not be performed, the flow advances to the step S10107. Conversely, if there is no uninvertible size, i.e., if the sizes included in the job are all invertible, the flow advances to a step S10104.

In the step S10104, the printer manager 1526 checks the output sheet types of all the pages in the image forming job stored in the HDD 2004, and creates the list of the output sheet types included in one job as shown in FIG. 25 on the RAM 2002. In FIG. 25, numeral 10301 denotes columns of the sheet types including the sheet types capable of being output. The sheet types capable of being output have been previously stored in the ROM 2003. When the list is created, the printer manager 1526 reads from the ROM 2003 the sheet types capable of being output and writes the read types into the list on the RAM 2002.

Numeral 10302 denotes columns of the number of output sheets, and each column shows the number of output sheets for each sheet type included in one job. The printer manager 1526 counts the number of output sheets for each sheet type output in one job, and writes the obtained value into the list on the RAM 2002. Numeral 10303 denotes columns of invertibility/uninvertibility confirmation for the recording sheet. Namely, "UNINVETIBLE" is set for the sheet type to which the sheet inversion is unsuitable, while "INVERTIBLE" is set for the sheet type to which the sheet inversion may be performed. As shown in FIG. 25, since the thick sheet and the OHP sheet (transparent sheet) which are too tough and thus unsuitable for inversion, "UNINVETIBLE" is set. Further, since the thin sheet is too weak and thus unsuitable for inversion, "UNINVETIBLE" is set. The information concerning invertibility/uninvertibility for each sheet type is stored in the ROM 2003. When the list is created, the printer manager 1526 reads from the ROM 2003 the invertibility/uninvertibility information and writes the read information into the list on the RAM 2002. When the list of the output sheet types shown in FIG. 25 is completed, the flow advances to a step S10105.

In the step S10105, the columns 10302 of the number of output sheets for the respective types are checked on the RAM 2002, and it is judged whether or not the number of output sheets to which "UNINVERTIBLE" has been set is "0" for all the types. If there is the counted value "1" or more for even one of the plural uninvertible types, i.e., if the job includes the sheet type to which sheet inversion can not be performed, the flow advances to the step S10107. Conversely, if there is no uninvertible sheet type, i.e., if the sheet types included in the job are all invertible, the flow advances to a step S10106.

The face-down sheet discharge process is performed in the step S10106, while the face-up sheet discharge process is performed in the step S10107. When the face-down sheet discharge process is performed in the step S10106, the image forming is performed from the first page in the ascending order. On the other hand, when the face-up sheet discharge process is performed in the step S10107, the image forming is performed from the last page in the descending order.

Besides the above embodiment, following embodiments are applicable.

(1) The program codes themselves of the above software realize the functions of the above embodiment. Thus, the program codes themselves and the means for supplying these program codes to the image processing apparatus 1001 (e.g., the recording medium storing such the program codes) constitute the present invention.

(2) A case where, in order to operate various devices to realize the functions of the above embodiment, the program codes of software to realize the functions of the above embodiment are supplied to a CPU in the system connected to the above various devices, and the CPU in this system operates the above various devices according to the stored program codes is included in the scope of the present invention.

(3) As the recording medium for storing the program codes, e.g., a floppy disk, a hard disk, an optical disk, a magnetooptical disk, a magnetic tape, a nonvolatile memory card, a ROM, or the like can be used.

As described above, when the plural recording sheets are inverted and continuously output, it is checked whether or not each recording sheet is invertible by the inversion function. Then, if the recording sheet which is uninvertible exists, all of the plural recording sheets are not inverted and output faceup.

Thus, even if the recording sheets of sizes capable of being inverted and discharged and the recording sheets of sizes incapable of being inverted and discharged mix together, it is possible to output the sheets with the same face up. Further, even if the recording sheets of types capable of being inverted and discharged and the recording sheets of types incapable of being inverted and discharged mix together, it is possible to output the sheets with the same face up. Further, even if the recording sheets of sizes capable of being inverted and discharged, the recording sheets of types capable of being inverted and discharged, the recording sheets of sizes incapable of being inverted and discharged, and the recording sheets of types incapable of being inverted and discharged mix together, it is possible to output the sheets with the same face up.

Although the present invention has been explained with the preferred embodiments, the present invention is not limited to them. Namely, it is obvious that various modifications and changes are possible in the present invention without departing from the spirit and scope of the appended claims.

What is claimed is:

1. An image forming apparatus comprising:
   an image forming unit for forming images included in an image forming job on sheets;
   an inverter for inverting the sheet formed by said image forming unit;
   a controller for controlling a transportation of the sheet whether or not the sheet formed is transported to said inverter; and
   a discriminator for discriminating if the image forming job includes at least one page which is not preferable to be inverted,
   wherein said controller controls the transportation of the sheet so that all pages of sheets regarding the image forming job are not transported to said inverter when said discriminator discriminates that the image forming job includes at least one sheet which is not preferable to be inverted.

2. An apparatus according to claim 1, wherein said discriminator discriminates if the sheet is not preferable to be inverted in accordance with a size of the sheet designated by the image forming job.

3. An apparatus according to claim 2, wherein said discriminator discriminates that the sheet is not preferable to be inverted when the size of the sheet designated by the image forming job is at least one of a size of postcard and a free size.

4. An apparatus according to claim 2, wherein said discriminator discriminates by checking sizes of all pages regarding the image forming job after storing the image forming job whether the sheet is not preferable to be inverted.

5. An apparatus according to claim 1, wherein said discriminator discriminates if the sheet is not preferable to be inverted in accordance with a type of the sheet designated by the image forming job.

6. An apparatus according to claim 5, wherein said discriminator discriminates that the sheet is not preferable to be inverted when the type of the sheet designated by the image forming job is at least one of a thick sheet, a transparent sheet, and a thin sheet.

7. An apparatus according to claim 5, wherein said discriminator discriminates by checking sheet types of all pages regarding the image forming job after storing the image forming job whether the sheet is not preferable to be inverted.

8. An apparatus according to claim 1, wherein said inverter inverts so that the sheet is discharged in a facedown state.

9. An apparatus according to claim 1, wherein said controller controls the transportation of the sheet so that all sheets regarding the image forming job are transported to said inverter when said discriminator discriminates that the image forming job does not include any sheet which is not preferable to be inverted and when a facedown discharge is designated by the image forming job.

10. An apparatus according to claim 1, wherein said controller controls the transportation of the sheet so that the sheet is discharged in a faceup state when the sheet is not transported to said inverter.

11. A method for controlling an image forming apparatus having an inverter for inverting the sheet, comprising the steps of:
    forming images included in an image forming job on sheets;
    discriminating if the image forming job includes at least one page which is not preferable to be inverted; and
    controlling a transportation of the sheet so that all pages of sheets regarding the image forming job are not transported to said inverter when said discriminating step discriminates that the image forming job includes at least one sheet which is not preferable to be inverted.

12. A method according to claim 11, wherein said discriminating step discriminates if the sheet is not preferable to be inverted in accordance with a size of the sheet designated by the image forming job.

13. A method according to claim 12, wherein said discriminating step discriminates that the sheet is not preferable to be inverted when the size of the sheet designated by the image forming job is at least one of a size of postcard and a free size.

14. A method according to claim 12, wherein said discriminating step discriminates by checking sizes of all pages regarding the image forming job after storing the image forming job whether the sheet is not preferable to be inverted.

15. A method according to claim 11, wherein said discriminating step discriminates if the sheet is not preferable to be inverted in accordance with a type of the sheet designated by the image forming job.

16. A method according to claim 15, wherein said discriminating step discriminates that the sheet is not preferable to be inverted when the type of the sheet designated by the image forming job is at least one of a thick sheet, a transparent sheet, and a thin sheet.

17. A method according to claim 15, wherein said discriminating step discriminates by checking sheet types of all pages regarding the image forming job after storing the image forming job whether the sheet is not preferable to be inverted.

18. A method according to claim 11, wherein said inverter inverts so that the sheet is discharged in a facedown state.

19. A method according to claim 11, wherein said controlling step controls the transportation of the sheet so that all sheets regarding the image forming job are transported to said inverter when said discriminating step discriminates that the image forming job does not include any sheet which is not preferable to be inverted and when a facedown discharge is designated by the image forming job.

20. A method according to claim 11, wherein said controlling step controls the transportation of the sheet so that the sheet is discharged in a faceup state when the sheet is not transported to said inverter.

21. A recording medium for storing a program code for controlling an image forming apparatus having an inverter for inverting the sheet, the program code comprising:
- a code for causing said image forming apparatus to form images included in an image forming job on sheets;
- a code for discriminating if the image forming job includes at least one page which is not preferable to be inverted; and
- a code for controlling a transportation of the sheet so that all pages of sheets regarding the image forming job are not transported to said inverter when said discriminating code discriminates that the image forming job includes at least one sheet which is not preferable to be inverted.

22. A recording medium according to claim 21, wherein said discriminating code discriminates if the sheet is not preferable to be inverted in accordance with a size of the sheet designated by the image forming job.

23. A recording medium according to claim 22, wherein said discriminating code discriminates that the sheet is not preferable to be inverted when the size of the sheet designated by the image forming job is at least one of a size of postcard and a free size.

24. A recording medium according to claim 22, said discriminating code discriminates by checking sizes of all pages regarding the image forming job after storing the image forming job whether the sheet is not preferable to be inverted.

25. A recording medium according to claim 21, wherein said discriminating code discriminates if the sheet is not preferable to be inverted in accordance with a type of the sheet designated by the image forming job.

26. A recording medium according to claim 25, wherein said discriminating code discriminates that the sheet is not preferable to be inverted when the type of the sheet designated by the image forming job is at least one of a thick sheet, a transparent sheet, and a thin sheet.

27. A recording medium according to claim 25, wherein said discriminating code discriminates by checking sheet types of all pages regarding the image forming job after storing the image forming job whether the sheet is not preferable to be inverted.

28. A recording medium according to claim 21, wherein said inverter inverts so that the sheet is discharged in a facedown state.

29. A recording medium according to claim 21, wherein said controlling code controls the transportation of the sheet so that all sheets regarding the image forming job are transported to said inverter when said discriminating code discriminates that the image forming job does not include any sheet which is not preferable to be inverted and when a facedown discharge is designated by the image forming job.

30. A recording medium according to claim 21, wherein said controlling code controls the transportation of the sheet so that the sheet is discharged in a faceup state when the sheet is not transported to said inverter.

* * * * *